United States Patent
Khanna et al.

(10) Patent No.: US 10,067,987 B1
(45) Date of Patent: Sep. 4, 2018

(54) STORAGE, RETRIEVAL, AND RANKING OF DATA OBJECTS REPRESENTING INSIGHTS

(71) Applicant: humanLearning Ltd., St. Albans (GB)

(72) Inventors: Arti Khanna, New Delhi (IN); Kapil Singhal, Harpenden (GB)

(73) Assignee: HUMANLEARNING LTD., St. Albans (GB)

( * ) Notice: Subject to any disclaimer, the term of this patent is extended or adjusted under 35 U.S.C. 154(b) by 344 days.

(21) Appl. No.: 15/046,012

(22) Filed: Feb. 17, 2016

Related U.S. Application Data

(60) Provisional application No. 62/117,372, filed on Feb. 17, 2015.

(51) Int. Cl.
*G06F 17/00* (2006.01)
*G06F 17/30* (2006.01)

(52) U.S. Cl.
CPC .... *G06F 17/3053* (2013.01); *G06F 17/30554* (2013.01); *G06F 17/30598* (2013.01); *G06F 17/30867* (2013.01)

(58) Field of Classification Search
CPC ......... G06F 17/30598; G06F 17/30867; G06F 17/30864; G06F 17/2795; G06F 17/3066
See application file for complete search history.

(56) References Cited

U.S. PATENT DOCUMENTS

2016/0321716 A1* 11/2016 Ravikant ............ G06Q 30/0601

* cited by examiner

*Primary Examiner* — Truong Vo
(74) *Attorney, Agent, or Firm* — Fenwick & West LLP

(57) ABSTRACT

A system maintains data objects representing insights. The system captures an insight object as a segmented media object. The system maintains user circles based on various topics of interest to users. The system assigns expertise scores to users within a circle. A user may have different expertise scores for different topics. The systems assigns significance scores for the insight objects based on user interactions performed with the insight object, the interactions weighted by expertise scores of users performing the interactions for topics associated with the insight. The system determines a schedule for repeated delivery of the insight to one or more users. The system adjusts the delivery of the insight to a user based on scheduled events or user activity of the user and delivers the insight in accordance with the schedule.

20 Claims, 20 Drawing Sheets

STORAGE, RETRIEVAL, AND RANKING OF DATA OBJECTS REPRESENTING INSIGHTS

CROSS REFERENCES TO RELATED APPLICATIONS

This application claims the benefit of U.S. Provisional Application No. 62/117,372, filed on Feb. 17, 2015, which is incorporated by reference in its entirety.

BACKGROUND

This invention relates in general to data and information storage and retrieval, and more specifically to capture, storage, machine learning based tagging, scoring, ranking, discovery, filtering and transmission of data objects representing content items, for example, content items captured as segmented media.

Organizations generate large amount of data and content based on user interactions. Various types of content generated by users is spread across various applications and formats. For example, content may be provided and exchanged via emails, videos, documents, web pages, or shared on calls as conversations, and so on. However, significant content often gets lost within the large amount of information generated. For example, a user may draft a document describing a concept that is significant for the enterprise. However, conventional techniques for information retrieval may not rank the document very high in enterprise searches. As a result, the document is likely to get lost within other documents generated by other users. This causes several significant content items provided by users to get lost in the plethora of the information generated by the enterprise without giving a chance to other users to view or comment upon the content item. Conventional techniques rely on the manual efforts of the user in delivering the content item to other users in order to disseminate the information captured within the content item. Accordingly content items aggressively promoted by individuals gain higher visibility with the enterprise even if the content items are not significant with respect to particular topics of interest to users of the enterprise.

SUMMARY

Embodiments of the invention maintain objects representing insights of users. An insight management system maintains circles of users, each circle comprising a plurality of users associated with at least a topic. The system stores data objects representing an insight. For example, a data object may represent an insight using a segmented media object captured by a user. The system determines an expertise score for users of the circle based on interactions performed by the users with data objects representing insights. A user may interact with a data object by adding information to the data object, commenting on the data object, sharing the data object, and so on.

The system receives information describing a new insight, for example, a segmented video or a text captured by a user. The system further receives interactions with the data object from users of the circle of users. The system determines a significance score for the data object. The significance score is indicative of a significance of the insight within the circle of users. The system determines the significance score as a weighted average of one or more of: an expertise score of the user providing the insight, expertise scores of users interacting with the new data object, types of interactions of the users and the topic of the insight (where different topics can be assigned different scores or priority multipliers). The system determines a rate of transmission or delivery of the data object to users of the circle based on the significance score of the new data object. In an embodiment, the system identifies an event associated with each user within a threshold of the next scheduled delivery. The system transmits the new data object to users of the circle in accordance with the determined rate of delivery or transmission and the associated event.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
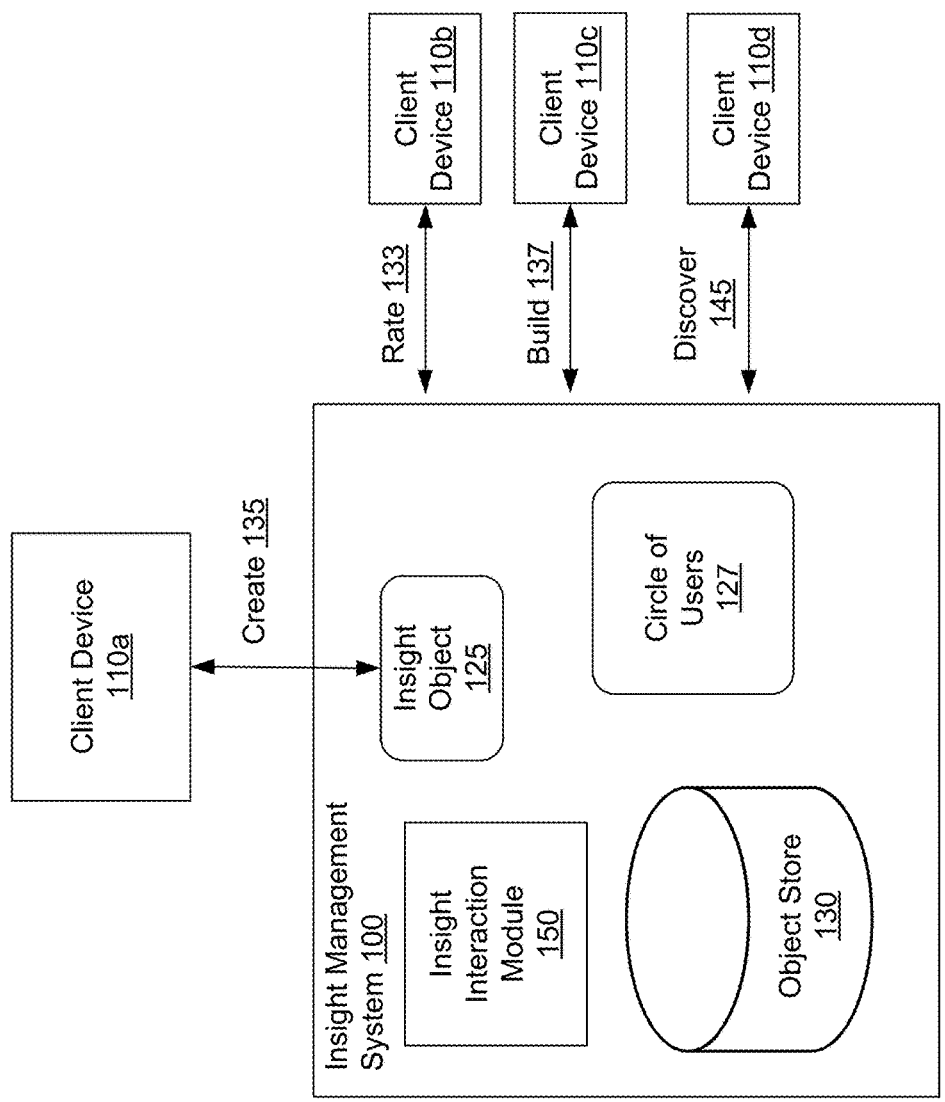
FIG. 1 is a diagram illustrating overall system environment for determining whether incoming messages are indicative of good or bad content, in accordance with an embodiment of the invention.

FIG. 1 is a diagram illustrating overall system environment for determining whether incoming messages are indicative of good or bad content, in accordance with an embodiment of the invention. The overall system environment comprises an insight management system and one or more client devices 110 interacting with the client device via a network (not shown in FIG. 1). FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

A client device 110a interacts with the insight management system 100 to create 135 an insight object 125 represented in the insight management system 100. In an embodiment, the insight object 125 is represented as a data structure and associated instructions for performing various operations using the data structure. The insight object is associated with one or more content items that comprise one or more of text, video, audio, images, and so on. A user specifies content for an insight. For example, a user may specify content describing a feature for a product, a change in a process, summary of a meeting, a product idea, a comment on an existing product/service/process, and so on. The data structure represents information identifying the insight object, various tags associated with the insight, information identifying the creator of the insight, one or more media objects representing content of the insight, and so on. The insight object encapsulates the information required to process the initial set of content items received from the user by receiving feedback describing the object from users, receiving information for building additional content related to the insight, delivering the insight to users for using/viewing the content, rating the content items, rating users based on their interactions with the content items, and so on. The insight object 125 is stored in the object store 130. The insight may be associated with one or more circles 127 of users. A circle 127 of user is associated with one or more topics of interest to the users of the circle. If the circle of user has one or more topics that match a topic associated with the insight, the insight object is associated with the circle and may be delivered to users of the circle.

The insight interaction module 150 allows various types of user interactions with the insight. Accordingly, users may interact with the insight object 125 using the client devices 110. A client device 110 may rate 133 an insight, build 137 on the insight, or discover 145 the insight by performing search operations. These are examples of types of interactions and the insight interaction module 150 allows other types of interactions. For example, a user may add insights to a collection so as to be able to view information describing the collection of insights, for example, statistics describing various actions performed by users on insights belonging to that collection. In an embodiment, the insight management system 100 sends notifications to users. A notification may be sent, for example, if a new insight is added to a collection associated with the user or a build is performed on an insight created by the user, or any other event occurs in the insight management system that is likely to be of interest to the user. In an embodiment, the insight management system 100 sends prompts to users requesting user to perform a particular user action. For example, the insight management system 100 may send a prompt to the user after a particular event such as a meeting, requesting user to create an insight based on the meeting or on the expiry of an action or reminder etc. In an embodiment, the insight management system 100 compares information describing an event to find matching insights and prompts the user after the event to build on the matching insights.

An insight object goes through many stages before reaching maximum relevance and value to the community of users. These stages in some embodiments include the following. The insight object is created through a capture process. The insight object is disseminated by sharing within a community of users, preferably driven by relevance and driving engagement. Other users build the object by providing additional information related to the insight. In case the insight management system 100 determines that the shared knowledge is not relevant then the system kills the insight object and removes it from the system. The insight management system 100 controls and uses the shared knowledge by spreading the knowledge further to related users or driving engagement around relevant subjects. The insight management system 100 determines significance scores for the insight object, for example, based on ratings received from users and user interactions. The insight management system 100 weighs the ratings received by the user based on the level of expertise of the user in a topic associated with the insight. For example, if a user has a high expertise score in a topic that is described in the insight, the rating provided by the user is weighted high compared to a user with low expertise score or a user having high expertise score but in a topic that is unrelated to the insight.

The insight management system 100 uses user feedback to determine and apply value to the insight in the context of the community. The insight management system 100 gets users to create actions, assign actions, set reminders and track closure on actions. The insight management system 100 builds context for the insight to facilitate the knowledge to be shared to relevant users. The insight management system 100 performs auditing and assesses if the insight is still relevant. The insight management system 100 analyzes the insight objects to draw further insights around operations/workflows/organization design/achievements tracking.

System Architecture

Figure 2:
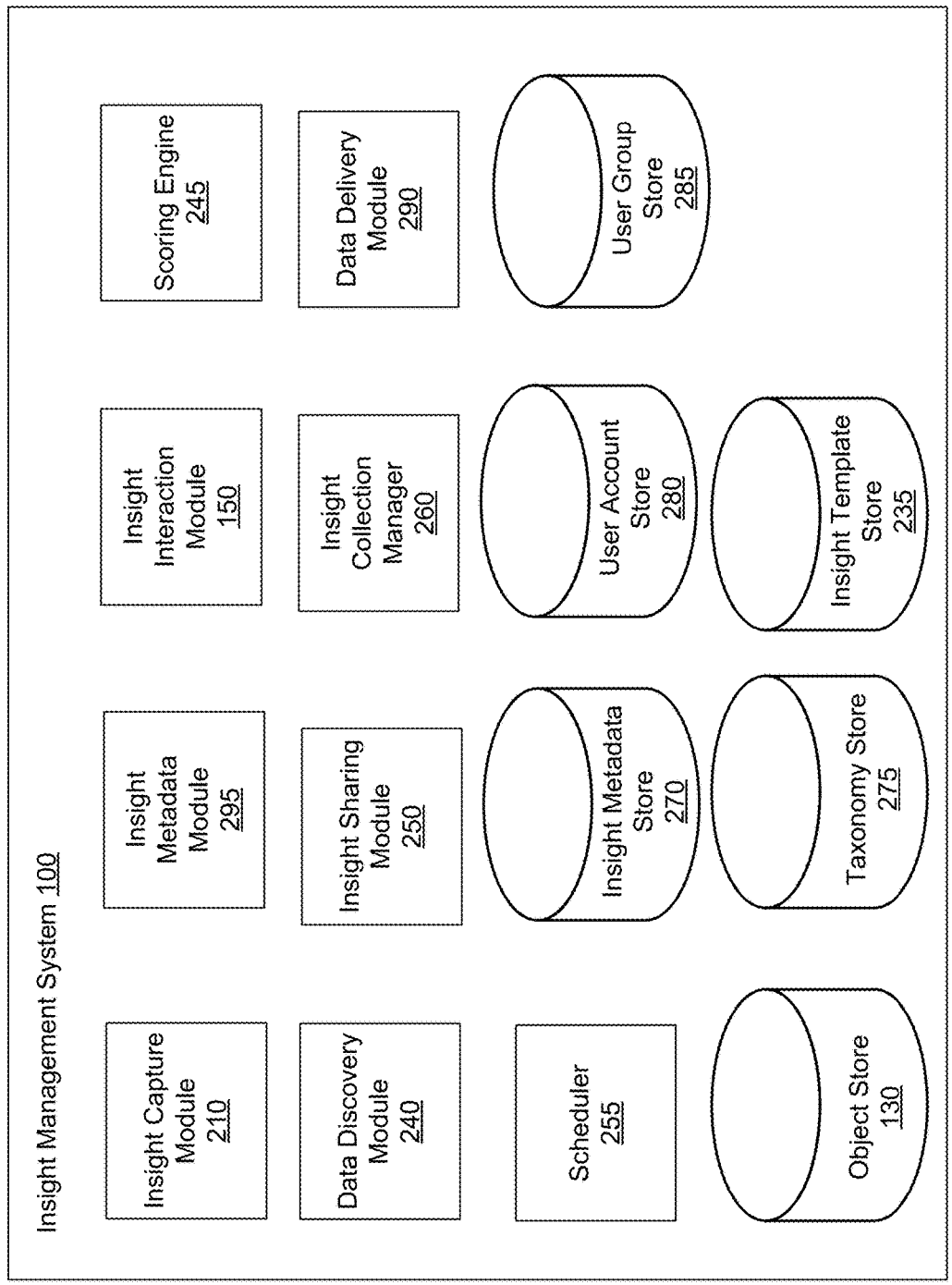
FIG. 2 illustrates the system architecture of the insight management system, in accordance with an embodiment of the invention.

FIG. 2 illustrates the system architecture of the insight management system, in accordance with an embodiment of the invention. The insight management system includes an insight capture module 210, an insight interaction module 230, a scoring engine 245, a data discovery module 240, an insight sharing module 250, a scheduler 255, an insight collection manager 260, a data delivery module 240, an object store 130, an insight metadata store 270, a user account store 280, a user group store 285, and a taxonomy store 275. Other embodiments may include more, fewer, or different modules than those shown in FIG. 2. The modules may be executed on one or more processors. Functionality indicated herein as being performed by a particular module may be performed by other modules.

An object store 130 stores various objects including insight objects, collection objects (representing collections of insights), community objects (representing a community of users, specifying functions, roles, themes, etc. for a community), circles (including access rules for the circle, designated roles such as administrators, moderators, associations such function mapping to circles etc., properties such as archive, enable/disable auto-collections etc.), tags (the list of tags in the system; tags are associated with Insights as insight meta data but several associations are also derived and maintained and managed such association of tags with circles, association of tags with users, tags with categories and topics etc.), categories, topics, templates, competitions, and so on.

The user account store 280 stores user information. This includes static data as provisioned for the user e.g., role, function, location, configuration data based on user's settings and preferences e.g. circle assignments, enable/disable notifications, set interval durations for digests (daily, weekly, etc.), interest areas and so on. Some user data tracks the user state in the system (e.g. onboarding stage) and some user data is dynamically generated by the system by tracking user activities, complete view of user engagement (no of views, builds, shares etc./other actions), trends, topics/interest areas, calendar entries.

The scheduler 255 manages scheduling of actions associated with a user. For example, the scheduler 255 tracks various events associated with the user, for example, meetings of users or action schedules and reminders, events associated with user based on external systems such as CRM systems, etc. The scheduler also manages scheduling of actions associated with insights. For example, the scheduler manages the delivery of information describing insights to users. The scheduler also manages requests for creation of new insights to users by presenting user interfaces for capturing insights. For example, the scheduler 255 schedules a request for creation of a new insight after a particular meeting or other event triggers such as stage completion for a process cycle (say account entering the next stage in sales cycle) or the expiry of an action schedule or reminder.

The insight management system 100 may interface with an external system, for example, a CRM system. The insight management system 100 associates insights with different objects in the external system (e.g. Accounts, Opportunities, Contacts in the CRM system) and receives information describing events associated with users of the insight management system 100 from an external system. The user interfaces illustrated in FIGS. 9F and 9G describe the interaction of the insight management system 100 to associate an insight with the external system and to receive different types of information from an external system. The insight management system 100 uses the information received from the external system for scheduling actions for capturing new insights, for requesting user to provide information related to existing insights, or for determining when to deliver information describing particular insights to users.

The insight template store 235 stores various types of templates for creation of insights. The insight template store 235 associates a template with a scope. For example, the insight template store 235 may mark a template as being personal and associate the template with a particular user. This template can only be used by the associated user. The insight template store 235 may mark the template with one or more circles of users such that the insight management system 100 allows all users of the circle to use the template. The insight template store 235 may associate a template with a particular community such that the insight management system 100 allows users of the community to use the template. The insight template store 235 also associates a template with a process or workflow event. The template is associated with a workflow event or a process of the organization/enterprise or any activity performed by a set of users. For example, a template may be associated with a sales workflow of a sales organization, or a workflow for capturing a product feature by a marketing or engineering department.

The taxonomy store 275 stores a taxonomy of various tags and categories associated with topics described in various insights as well as various interactions performed by the users. It also associates different scores or weighting factors or priority multipliers to different Topics. A taxonomy may be associated with users of a particular circle or users of community. The insight management system dynamically adjusts the taxonomy based on content receives by the system. The data delivery module 290 delivers the insights to users, for example, users belonging to one or more circles associated with topics described in the insight.

In an embodiment, the insight management system 100 is implemented as a RESTful web service. A webserver receives requests for interactions with the insight management system 100. The insight management system 100 configures a user interface for performing certain interaction with the user, for example, using REST APIs or as a web page (HTML page). The insight management system 100 sends the configured user interface to the client device. The client device renders user interface for presenting to the user via the display of the client device.

Figure 3:
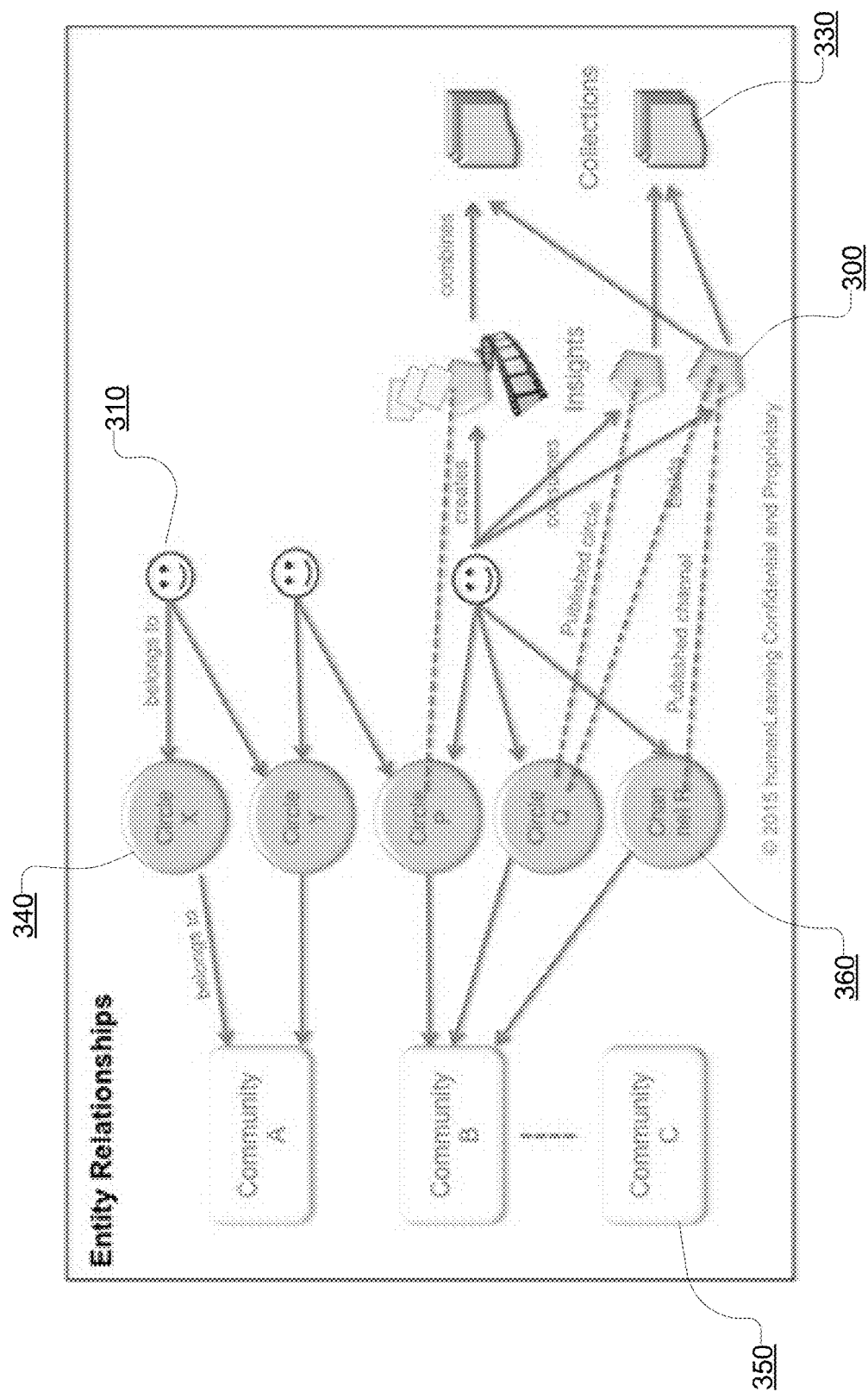
FIG. 3 illustrates various entities represented in the insight management system including circles, communities, users, insights, and collections, in accordance with an embodiment of the invention.

FIG. 3 illustrates various entities represented in the insight management system including circles, communities, users, insights, and collections, in accordance with an embodiment of the invention. These entities are described below in connection with various modules managing the entities in the insight management system.

The user account store 280 stores user accounts for various users of the insight management system 100. A user account stores information for a user of the insight management system 100 that may either capture a new insight 300 or interact with existing insights 300.

The user group store 285 stores information describing groups of users. In an embodiment, the user group store 285 stores mappings from user identifiers to group identifiers to identify members of each group. In particular, the user group store 285 stores groups of users identified as communities 350 of users and circles 340 of users 310. The user group store 285 stores information describing multiple communities 350 and allows the set of users provisioned within a community to connect and share with each other.

The user group store 285 stores information associating a user with one or more communities 350. The user group store 285 identifies some communities 350 as public thereby making them accessible to all user accounts store in user account store. The user group store 285 associates each group of users with a set of functions performed within the group. For example, the user group store 285 defines the set of functions performed within each community. A function refers a role of the user in the organization or community. In an embodiment, the user group store 285 associates each user of a group with one primary function and optional one or more secondary functions. For example, a user may perform a primary function of a manager of a set of employees but perform a secondary function of an engineer.

The user group store 285 may store information describing sub-groups within a group. The sub-groups may be based on shared interests. The taxonomy store 275 stores a taxonomy for each function associated with groups. The taxonomy store 275 stores, for each taxonomy, a set of keywords typically used in their interactions. The taxonomy store 275 store a hierarchically organized set of Topics and categories associated with the keywords. It also maintains scores and priority multipliers for different Topics and Categories. The insight management system 100 uses the taxonomies for determining context and relevance for all users within the function and the community.

The user group store 285 stores for each community 350, one or more groups called circles 340. A circle 340 may include members from the same function or multiple functions. A user may be associated with one or more circles in a community and access is restricted and determined by circles and communities. The user group store 285 identifies one of the circles as the user's home circle. The insight management system 100 uses the home circle as the default circle for all user operations. The insight management system 100 allows users to create new insights, consume, or build on other's insights in the assigned circles.

In an embodiment, the user group store 285 defines channels 360 associated with a user group, wherein a channel 360 is a broadcast groups created for users having a specific interest area. Users, for example, experts may use a channel to share their experiences and skills. The insight management system 100 allows users to subscribe to channels based on the community guidelines. The insight management system 100 may allow a user to post in a channel 360 if the user has more than a threshold level of expertise, for example, based on the user's expertise score for a function.

In one embodiment, the user group store 285 assigns a user as a moderator for a group, for example, a community. The moderator is a user with special permissions to provision the community profile and permissions, create and manage circles and channels, add users, setup and modify user profiles, and define the attributes and preferences for community filters. The moderator may also act on any notifications that flag inappropriate content and setup community events. A moderator may have authority to designate other users as moderators who are permitted to create and manage circles and circle membership. In some embodiments, the insight management system 100 identifies a community as an open community where any user is permitted to create and manage circles and circle memberships.

The insight management system 100 allows insights 300 to be grouped into collections 330. A unit of information that can be created as an independent entity is referred to as an insight 300. An insight can be created as video, audio, text, image, or a combination of these. The insight management system 100 allows an insight to be captured as a single segment or multiple segments captured in a sequence.

The insight management system 100 allows insights 300 to be grouped into collections 330. A collection can include one or more insights from the same or different circles that are accessible to the user. The insight management system 100 may identify a collection as personal, circle-wide, community-wide or public (across multiple communities). A collection may be named by the user. In one embodiment, the insight management system 100 associates a user with a personal collection (called book mark) that is used by a user as an ad-hoc list. The insight management system 100 may automatically generate a collection.

Figure 4:
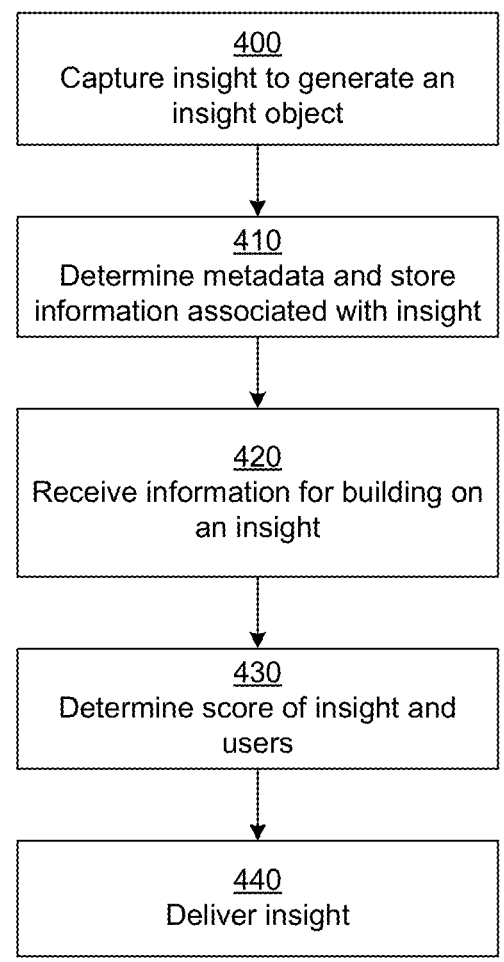
FIG. 4 is a flowchart of the process illustrating the various steps performed by the insight managements system for an insight, in accordance with an embodiment of the invention.

FIG. 4 is a flowchart of the process illustrating the various steps performed by the insight managements system for an insight, in accordance with an embodiment of the invention. The insight capture module 210 performs capture 400 of an insight to generate an insight object. The insight metadata module 295 determines 410 metadata associated with the insight, for example, tags and categories associated with the insight and stores the metadata in the insight metadata store 270. The insight interaction module 150 receives 420 various user interactions that provide additional information for the insight, for example, by building on the insight, commenting on the insight and so on. The scoring engine 245 determines 430 scores for the insights and users. In particular, the scoring engine 245 determined significance scores for insights and expertise scores of users for specific topics. The scheduler 255 identifies an event associated with the users within a threshold of the delivery schedule. The data delivery module 240 delivers 440 the insights to various users that are likely to be interested in the insight.

The insight management system 100 performs other actions related to an insight, for example, sharing an insight with one or more circles of users, auditing an insight, grouping insights as collections, and so on.

User Interactions with Insights

The insight interaction module 150 allows users to perform various types of interactions with insights. The interactions allows by the insight interaction module 150 include: (1) user interactions that drive to extend the set of data or Insights in the system such as capturing (create, build) and curating (rate, add meta-data such as tags, share, collect) of data (2) user interactions that result in accessing existing data from the system such as consume data (browse, view, search), monitor progress and track trends (leader boards, digests etc.), derive meaningful data to apply into workflows (analytics) (3) user interactions that setup the provisioning data (user profile, community attributes, circle memberships etc.) and relevance vectors (attributes, rule engine, preference filters etc.) that drive the decision modules.

The insight interaction module 150 allows users to view insights. The insight management system 100 sends information describing the insight to a client device responsive to receiving a request from the client device to access the insight. The insight management system 100 allows users to bookmark an insight for viewing at a later stage. The insight management system 100 creates various sets of insight for viewing by users, for example, most-valuable insights, most-built insights, most popular insights, most recent insights, insights created within a recent time interval, and so on.

The insight interaction module 150 allows users to rate insights. The insight interaction module 150 allows users to provide a rating indicating how inspirational the insight is or a rating indicating how actionable the insight is. The insight interaction module 150 allows users to build on an insight. A build of an insight represents additional information associated with the insight provided by a user. A build of an insight allows the insight to evolve. The insight interaction module 150 allows users to build an insight by adding text, media content (for example, by adding an image, video or audio file), a link to a uniform resource locator (URL), and so on. The insight interaction module 150 allows users to rate a build.

The data discovery module 240 allows users to discover insights by performing searches. The data discovery module 240 allows users to perform searches specifying various attributes including categories, tags, circles, users, insights, and so on. For example, a user may search for all insights created by users within a circle that include certain keyword.

The insight sharing module 250 allows a user to share an insight with one or more other users. The insight sharing module 250 allows a user to share an existing insight published in one circle to users in other circles (that the user has access to). This allows the community to re-use insights across a larger group of users. The insight sharing module 250 allows a user to mark an existing insight for attention to a designated user or set of users in a circle. The insight sharing module 250 also allows sharing of insights with external systems or work-flows like enterprise CRM, knowledge networks, social networks, email etc.

The insight collection manager 260 creates collections of insights either automatically or based on user input. A collection represents a high-value filter that can be shared with others to provide a quick reference to reusable information. For example, the insight collection manager 260 can create a collection of top N insights from a circle or set of circles over a specified time interval. The insight collection manager 260 can create a collection of insights associated with a category or tag. The insight collection manager 260 may associate a collection with a user, a circle or users or a set of circles of users.

Process of Capturing Insights

The insight capture module 210 associates templates with the events to guide the user to structure the data and ensure all key points for the associated events get covered. The insight capture module 210 associates templates with events also for compliance of data capture and for providing rich meta data that can be used for annotation, tagging, categorization or determination of topics associated with insights.

Following are examples of prompting capture of insights using templates associated with events. The insight capture module 210 may present a user interface for capturing an insight based on an event representing a calendar entry. The insight capture module 210 detects a completion of a meeting or event representing an account opportunity (associated with sales of a product), and prompts the user to capture an insight based on the status of the account opportunity and its stage in the sales cycle. The insight capture module 210 determines the status and stage values from data stored in the insight management system or by interfacing an external systems (such as enterprise CRM). If an existing opportunity is in early exploration stage with 30% probability, the insight capture module 210 uses an appropriate template to guide the user to capture the information required to progress to the next stage of qualified opportunity with 50% probability The insight capture module 210 may present a user interface for capturing an insight based on a process work-flow event. For example, insight capture module 210 detects a workflow transition representing a change from stage A to B, and trigger an event to prompt a user to capture an insight representing either the transition or the new stage, guiding the user with the appropriate mapped template. The insight capture module 210 receives information describing such workflow transitions from external systems (say a CRM recording an update in the status of an opportunity or an account) or internal systems of the organization associated with the insight management system (such as action work-flows, reminders etc.)

The insight capture module 210 may present a user interface for capturing an insight based on an events associated with an activity threshold on a topic. For example, insight capture module 210 detects an increased activity on a topic (that is identified as relevant for a user), the insight capture module 210 prompts the user with a template to add/extend the conversation by providing additional information for an existing insight or by adding a new insight.

The insight capture module 210 may present a user interface for capturing an insight based on an event representing a communication associated with a designated contact, for example, by email or phone call associated with the designated contact. In response, the insight capture module 210 triggers a capture request mapped to the contact life-cycle template.

Figure 5A:
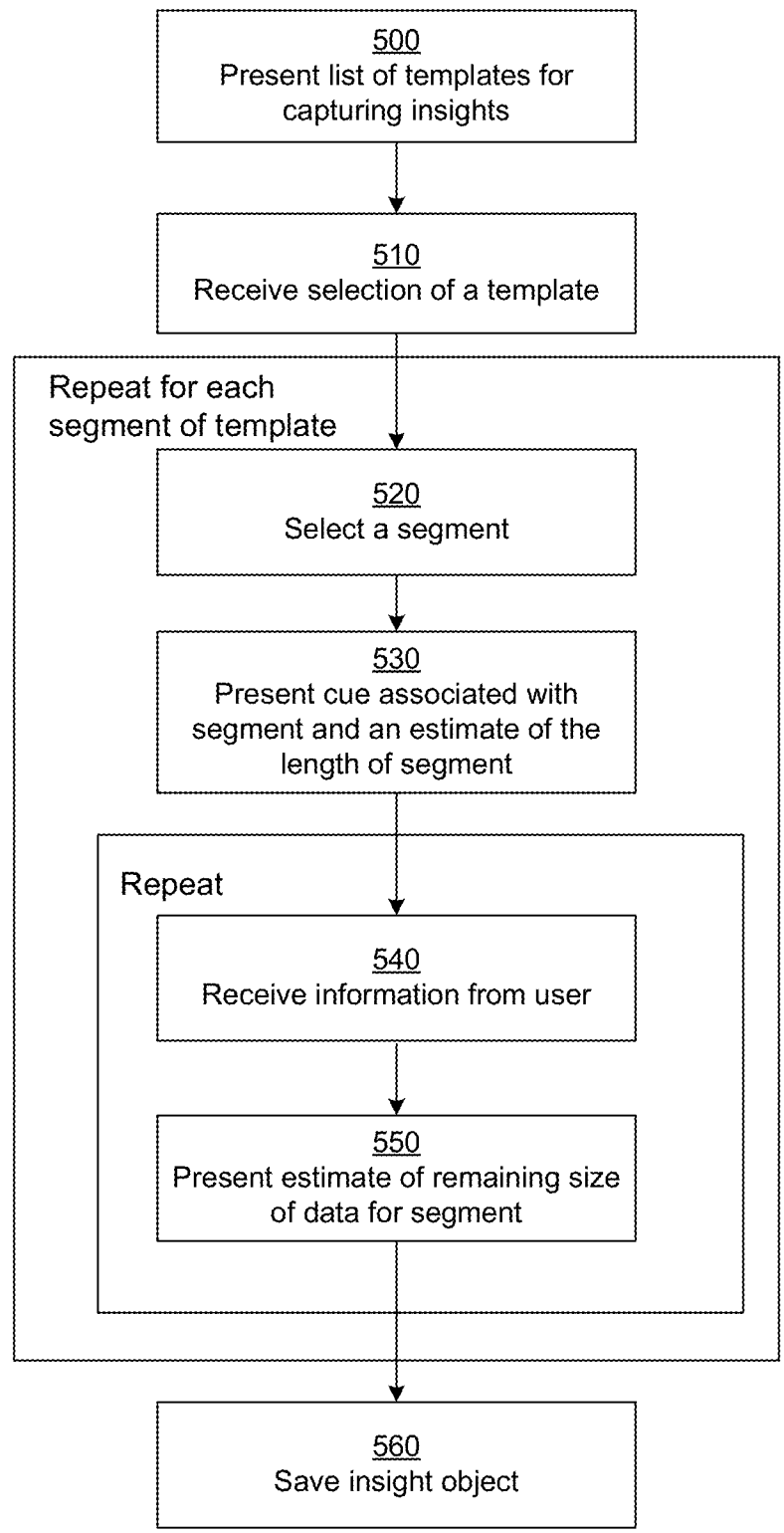
FIG. 5A is a flowchart illustrating a process for capturing an insight, in accordance with an embodiment of the invention.

The insight capture module 210 may present a user interface for capturing an insight based on a trigger determined by the user profile and interactions. The system maintains the interactions of a user (based on the user's profile—role/function etc.) and the past interactions (topic, category) and selects the appropriate templates based on the best fit. For example if a user manages product X then the associated templates around product X, competition for product X etc. would be prompted FIG. 5A is a flowchart illustrating a process for capturing an insight, in accordance with an embodiment of the invention. The insight capture module 210 executes instructions to capture an insight based on information received from a user. The insight capture module 210 stores the information describing the insight in the insight object store 130. The insight metadata store 270 stores metadata describing the insight captured.

The insight capture module 210 presents a list of one or more templates for capturing an insight to the user. The insight capture module 210 may present the list of templates responsive to user request. Alternatively, insight capture module 210 may schedule the action of presenting the list of templates based on a timing of an event. For example, the insight capture module 210 may identify an event associated with the user, for example, a meeting based on a calendar application. The insight capture module 210 identifies one or more topics associated with the event.

The insight capture module 210 selects a template based on the topics of the meeting and presents a user interface allowing the user to capture an insight based on the selected template at a threshold time interval after the scheduled event. This allows the user to capture information learnt from the meeting as an insight. An insight capture event may be triggered by other events, for example, an action prompt notifying expiry of specified time duration or a reminder to trigger a progress update.

Figure 9A:
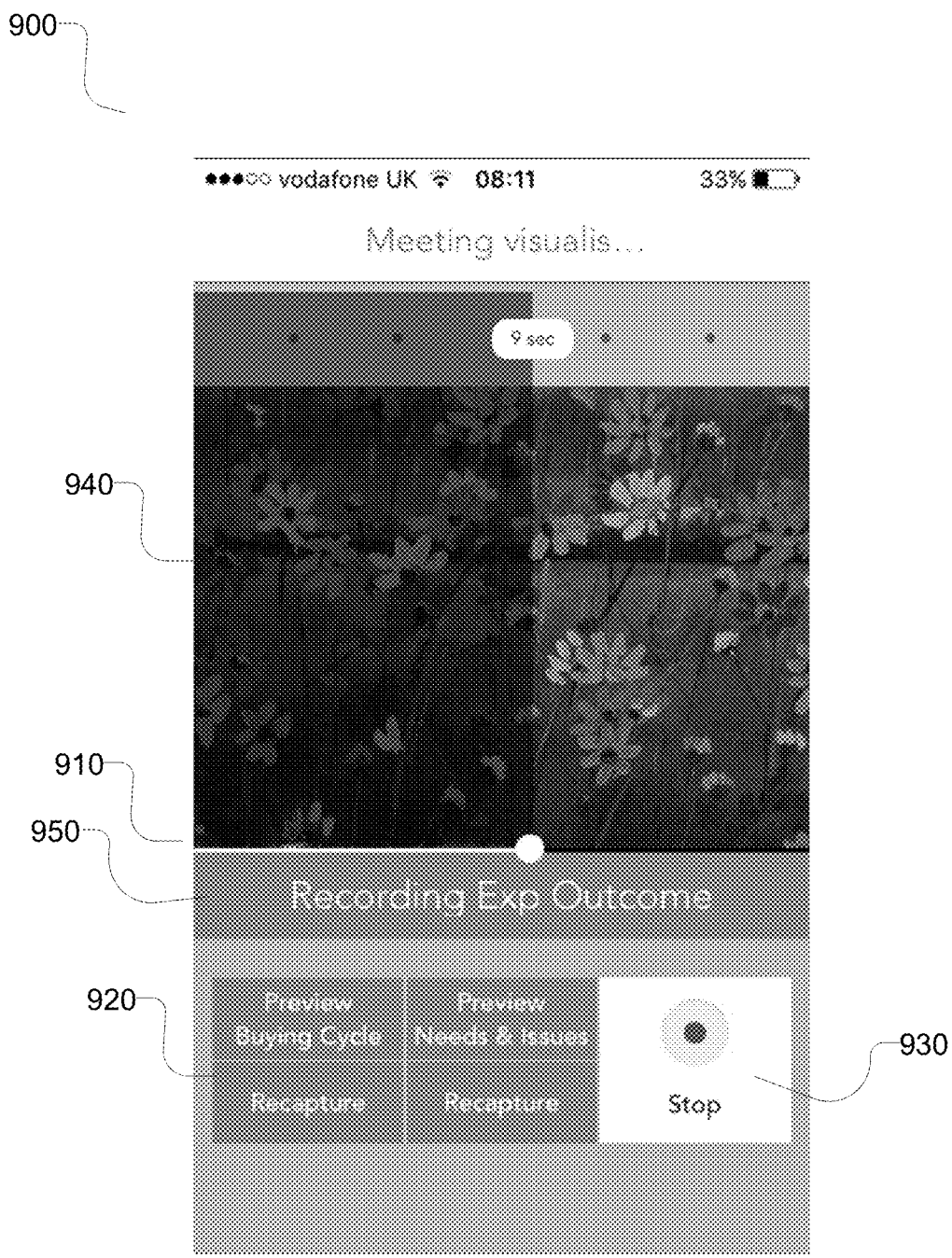
FIG. 9A is a screenshot of a user interface illustrating capture of an insight, in accordance with an embodiment of the invention.
Figure 9B:
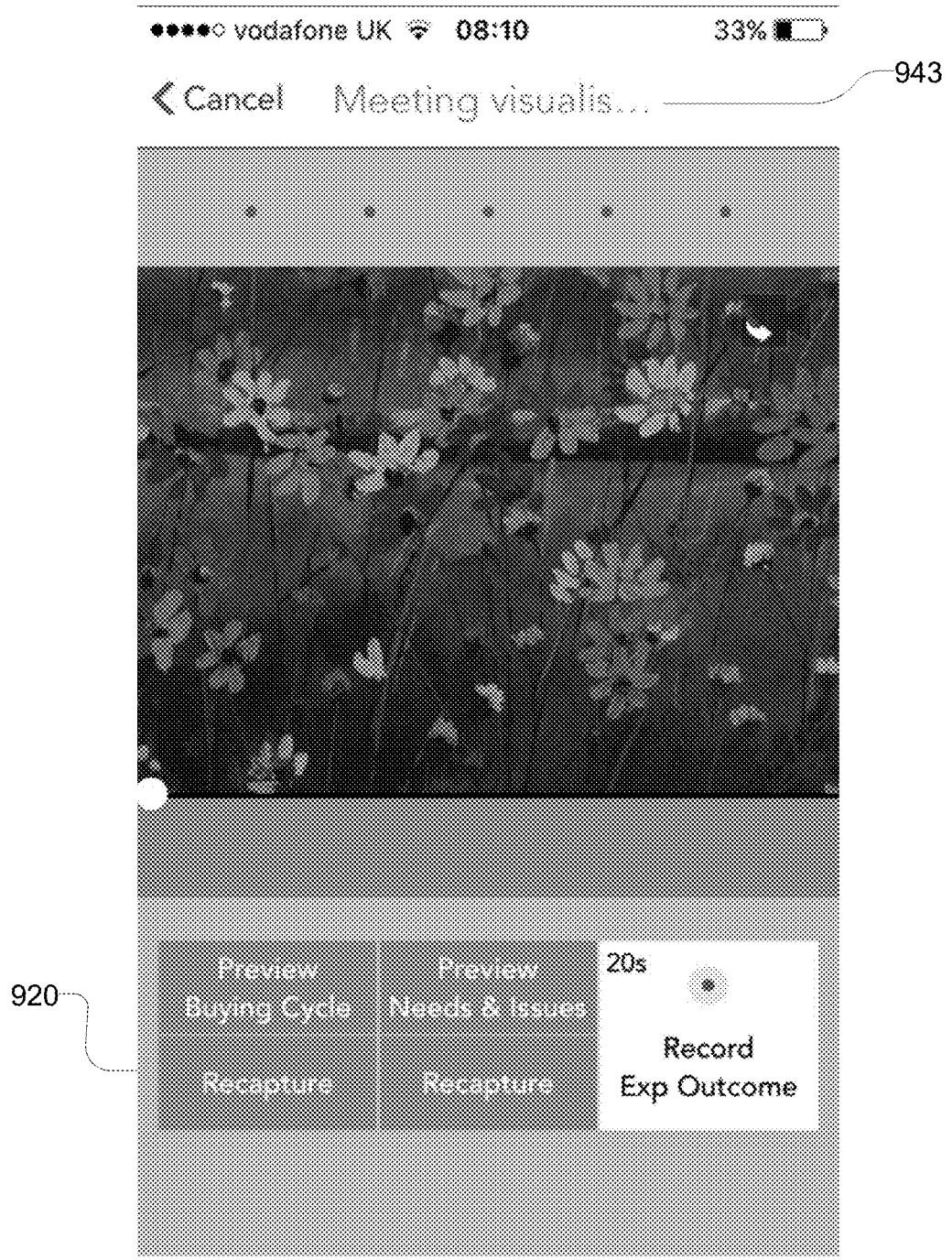
FIG. 9B is a screenshot of a user interface showing a selected template, in accordance with an embodiment of the invention.
Figure 9C:
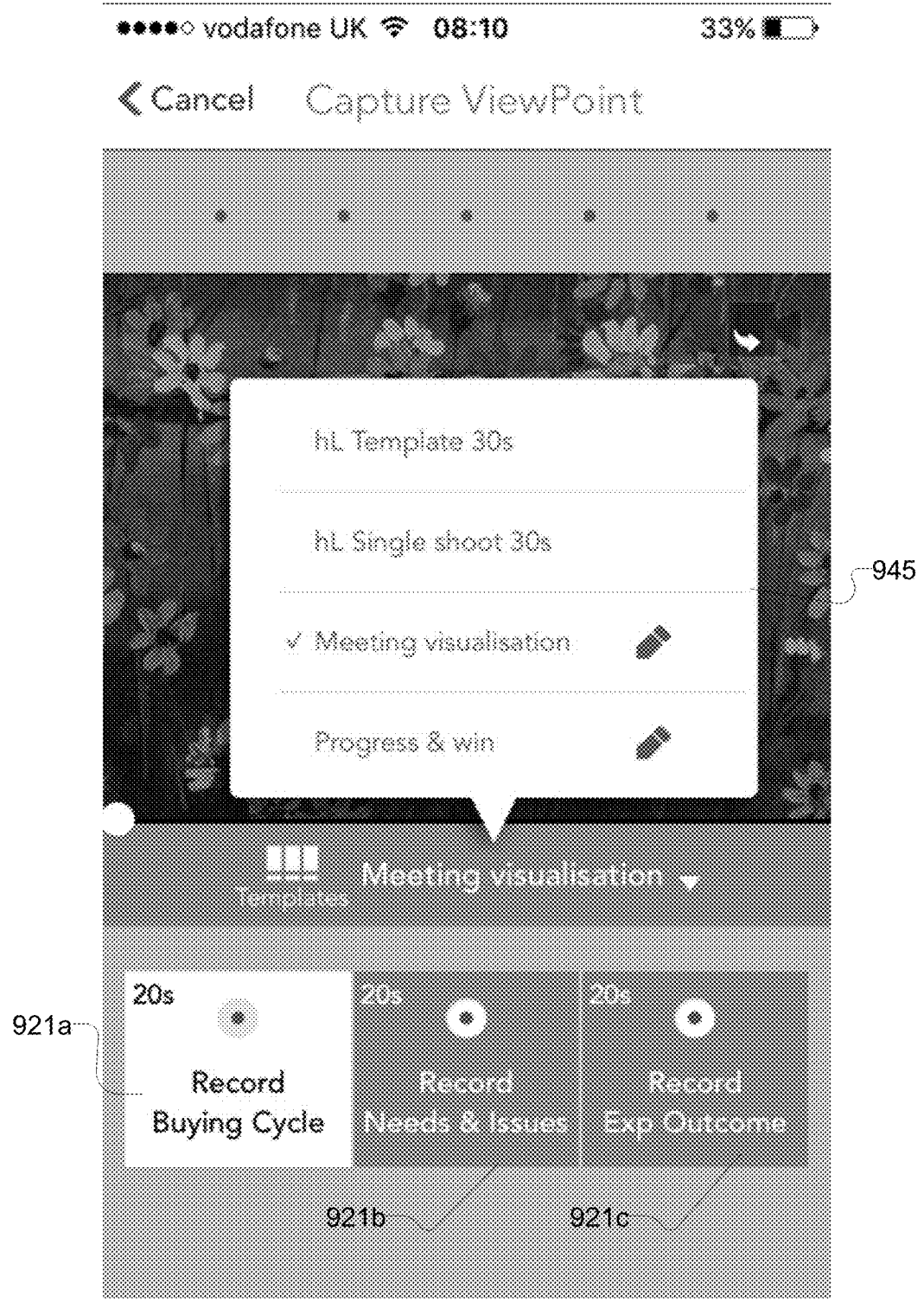
FIG. 9C is a screenshot of a user interface illustrating selection of a particular template, in accordance with an embodiment of the invention.
Figure 9D:
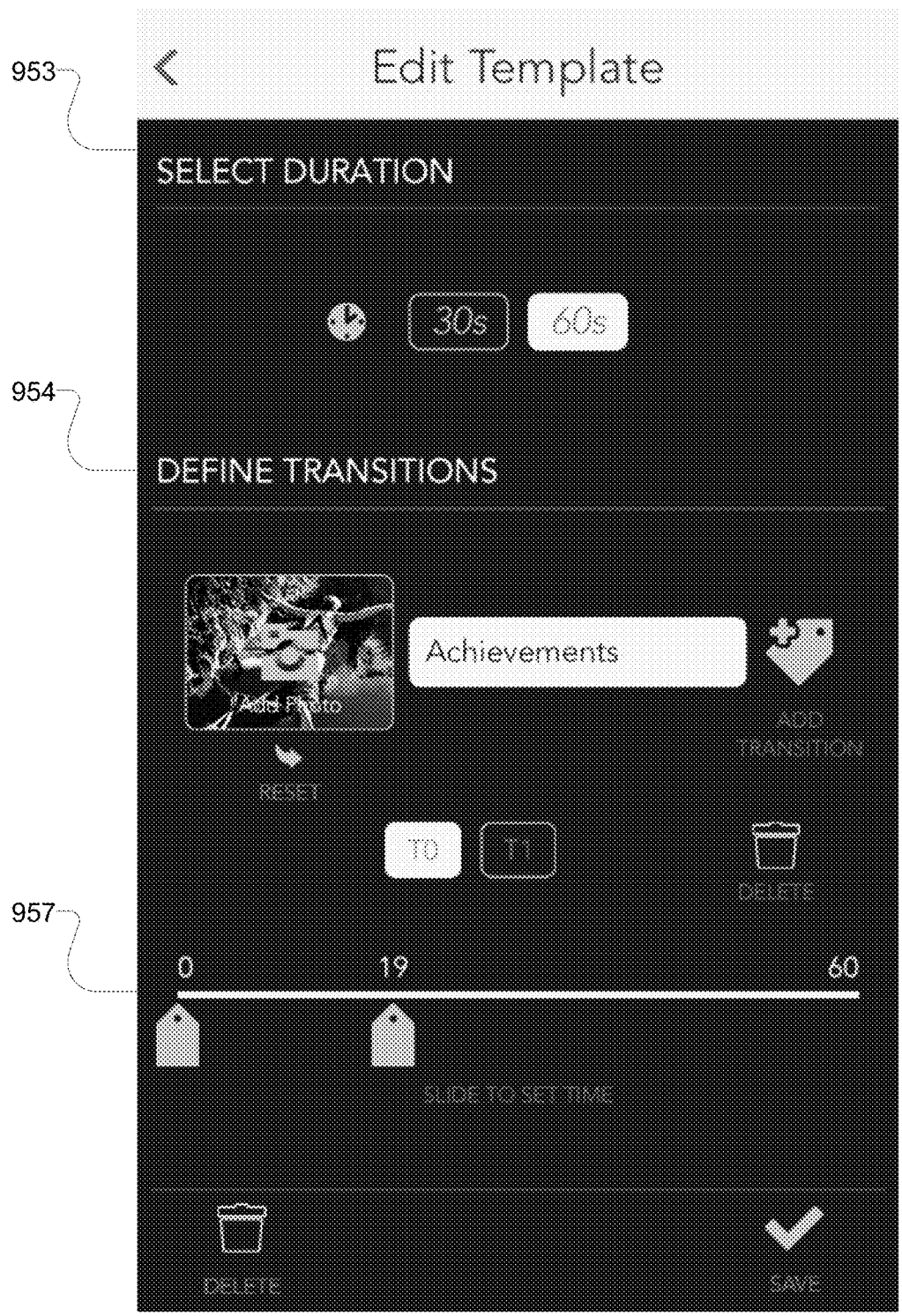
FIG. 9D is a screenshot of a user interface illustrating editing of a template, in accordance with an embodiment of the invention.
Figure 9E:
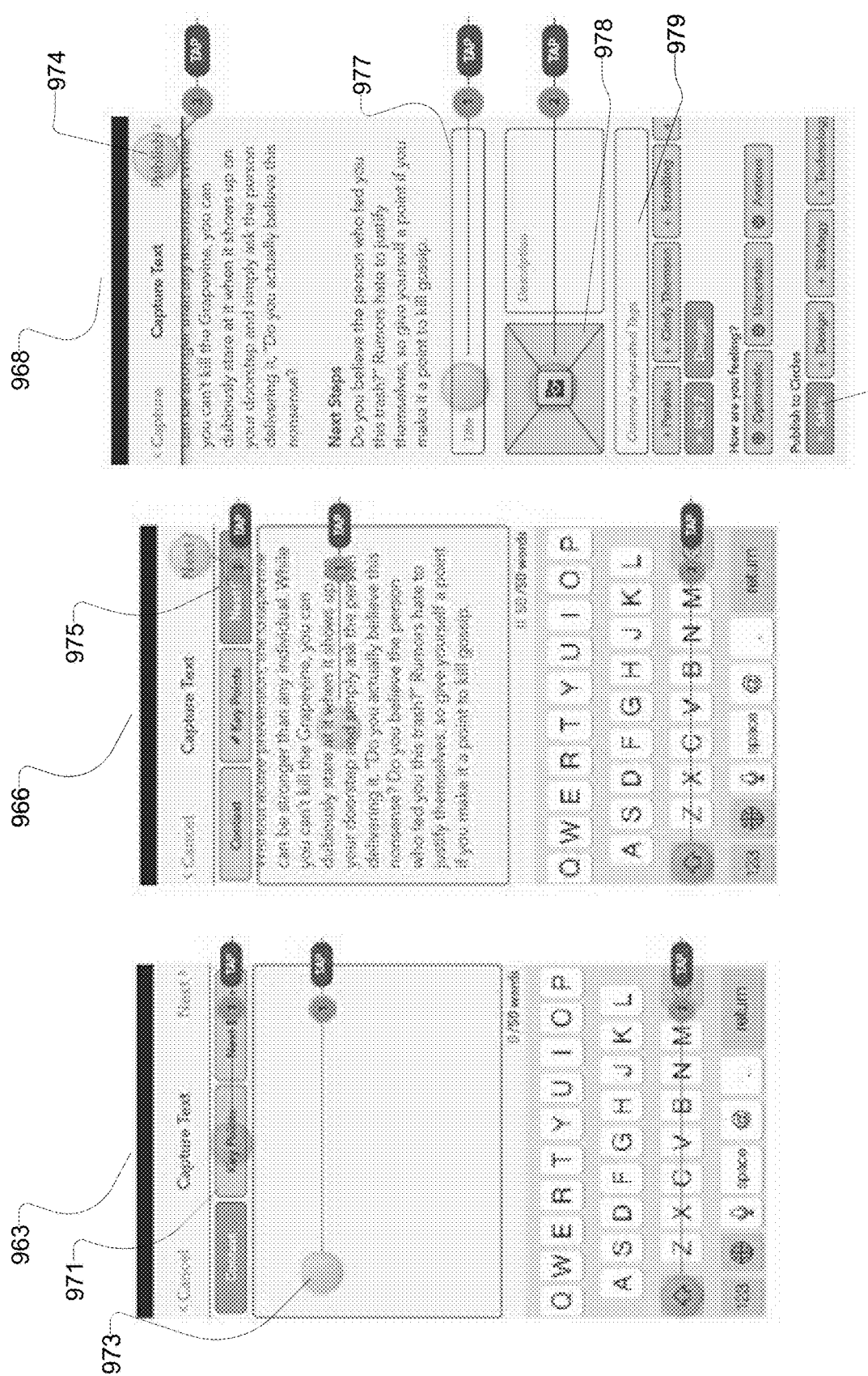
FIG. 9E is a screenshot of a user interface illustrating adding metadata to an insight, in accordance with an embodiment of the invention.

In an embodiment, the insight capture module 210 identifies a set of templates and presents a list of the identified templates to the user (for example, using widget 945 as shown in FIG. 9E.) The insight capture module 210 receives from the user, a selection of a particular template as the selected template. The insight capture module 210 configures for presentation a subsequent user interface based on the selected template.

In an embodiment, the insight capture module 210 identifies the set of templates for presentation to the user based on information describing the event. For example, the insight capture module 210 identifies templates matching topics associated with the event. The insight capture module 210 may identify the set of templates based on users associated with the event. For example, the insight capture module 210 may identify the set of templates that match topics associated with the users. The topics are associated with the users based on the content of user interactions performed by the user, or based on their role or functions in the organization.

In an embodiment, the event is associated with an external system such as a CRM system and the insight capture module 210 identifies the set of templates based on information describing an account of the external system, an opportunity described in the external system, a stage of a project associated with the external system, a contact associated with the external system or an account of the external system, and so on. For example, the insight capture module 210 may identify a set of templates that matches as account associated with the external system representing a potential engagement with a client. The potential engagement may be related to a product or service of the organization associated with the insight management system. Accordingly, the insight capture module 210 identifies templates related to these products or services.

As another example, the set of templates may be determined based on a stage of a project associated with the external system. For example, the organization associated with the insight management system may be involved in an ongoing interaction with a client, the ongoing interaction being associated with various stages for example, initial engagement, providing additional information/documents to client, providing demo to client, negotiating sales conditions, finalizing sales, and so on. The insight capture module 210 identifies the set of templates relevant to a particular stage and presents the set of templates.

In an embodiment, the insight capture module 210 determines a score based on the above factors, for example, as a weighted aggregate based on various factors described above. The insight capture module 210 configures for presentation a user interface that presents the set of templates in an order determined based on the score. In another embodiment, the insight capture module 210 automatically selects a template based on the score, for example, the template having the highest rank based on the score. The insight capture module 210 presents a user interface configured based on the selected template, whether the template is selected automatically by the insight capture module 210 or based on a user selection from a set of templates.

The insight capture module 210 configures for presentation a user interface for capturing the insight based on the selected template. The user interface includes a plurality of widgets for interacting with the insight management system, each widget for performing one or more interactions associated with a segment. In an embodiment, a widget is configured to allow a recording of a media segment (wherein media includes audio, video, and/or text), a recapture of a previously captured media segment, or view/review a previously captured media segment.

The insight capture module 210 schedules the presentation of the user interface within a threshold time interval of an identified event. In an embodiment, the insight capture module 210 schedules the presentation of the user interface after a particular time period following the event. For example, the insight capture module 210 may schedule the presentation of the user interface after a couple of hours of the event, thereby allowing the user to capture the insights based on the event.

The insight capture module 210 may set up a personalized capture experience for a user, for example, by letting the user customize various templates. The insight management system 100 allows a user to select the duration of the video from multiple options e.g., 30 seconds, 60 seconds etc. The insight management system 100 allows the user to define the transitions between segment, for example, for every transition, user can add the background image for the segment transition, the segment title, duration of the segment (and other format attributes). The insight management system 100 allows the user to setup the template either as a Personal template or share it with specific (one or more circles) or community.

The insight capture module 210 allows a user to set various preferences related to a template or a segment of a template, for example, whether the user wants to use the front or back camera of a mobile device, the length of specific segments or templates and so on. The insight capture module 210 gets user profile data to determine various circles that the user would like to publish the insight to. The insight capture module 210 also gets the user activity data to get a list of most often used tags for the user so that the tags can be attached as metadata for the captured insight.

The insight capture module 210 allows users to capture an insight as one or more segments. Accordingly, the insight capture module 210 repeats the following steps. The insight capture module 210 identifies all the segments of the template. A template is associated with a sequence of templates. Accordingly, the insight capture module 210 selects 520 a segment based on the order of the sequence. The insight capture module 210 presents 530 a cue associated with the selected segment and an estimate of the length of segment. The cue provides information to the user describing the segment being captured. The insight capture module 210 presents 550 an estimate of the length of segment to provide an indication of the amount of information to provide for the segment. The insight capture module 210 receives 540 information from the user (for example, an audio or video being recorded) and continuously updates and displays 550 the time remaining for the segment as the user records the segment. In an embodiment, the insight capture module 210 presents a time line indicating the progress made as well as the time remaining for the segment as the user records a video or audio for the segment. The insight capture module 210 allows the user to preview and re-record the current segment or any previously captured segment. Accordingly, the user may repeat the steps 530 and 540 multiple times for each segment. After all the segments of the template are recorded, the insight capture module 210 saves the insight in the insight object store 130.

The insight metadata module 290 adds metadata to the captured insight. The insight metadata module 290 associates the insight with a default thumbnail image, for example, a frame from the recorded video or video or a default structure for text insight. The insight metadata module 290 may receive additional information from the user, for example, title, description, categories, tags, a selection of circles for publishing, a selection for external systems (like Email, Enterprise CRM) for sharing, a confirmation if the user wants to publish or save as draft. The insight management system 100 runs a media editing algorithm to merge (with transition effects) the segments into a single video and stores the combined video.

Once the insight data is received, the insight management system 100 triggers a process for auto-tagging to add tags. The insight metadata module 295 runs auto-tagger to determine the relevant keywords from a taxonomy or previously added manual tags based on the user's role, function etc. For video insights, insight management system 100 optionally runs a speech recognition algorithm to get a transcript for the audio stream. The insight management system 100 runs the auto-tagger keyword spotting algorithm to determine the relevant keywords for the audio stream. The insight management system 100 runs a process to associate categories with the insight. This is based on association between tags and categories or additional meta data from segment templates (e.g. segment titles) The insight management system 100 also triggers the adjunct contextualization process to determine the target set of users for the insight. This takes into account multiple parameters such as circle access, interest areas/topics, tags/categories The insight management system 100 generates notification to all targeted users to notify that a new insight has been added.

The insight management system 100 triggers an auto-collection process to check if the insight needs to be associated with any collection. This is based on pre-defined rules. For example, a rule may specify that collections can be created based on template type say product feedback template (across all clients) and tagged with product X. This rule gives a curated list of all feedback on a product. Another example rule specifies creation of a collection based on a specific template providing a curated list of success stories.

Figure 5B:
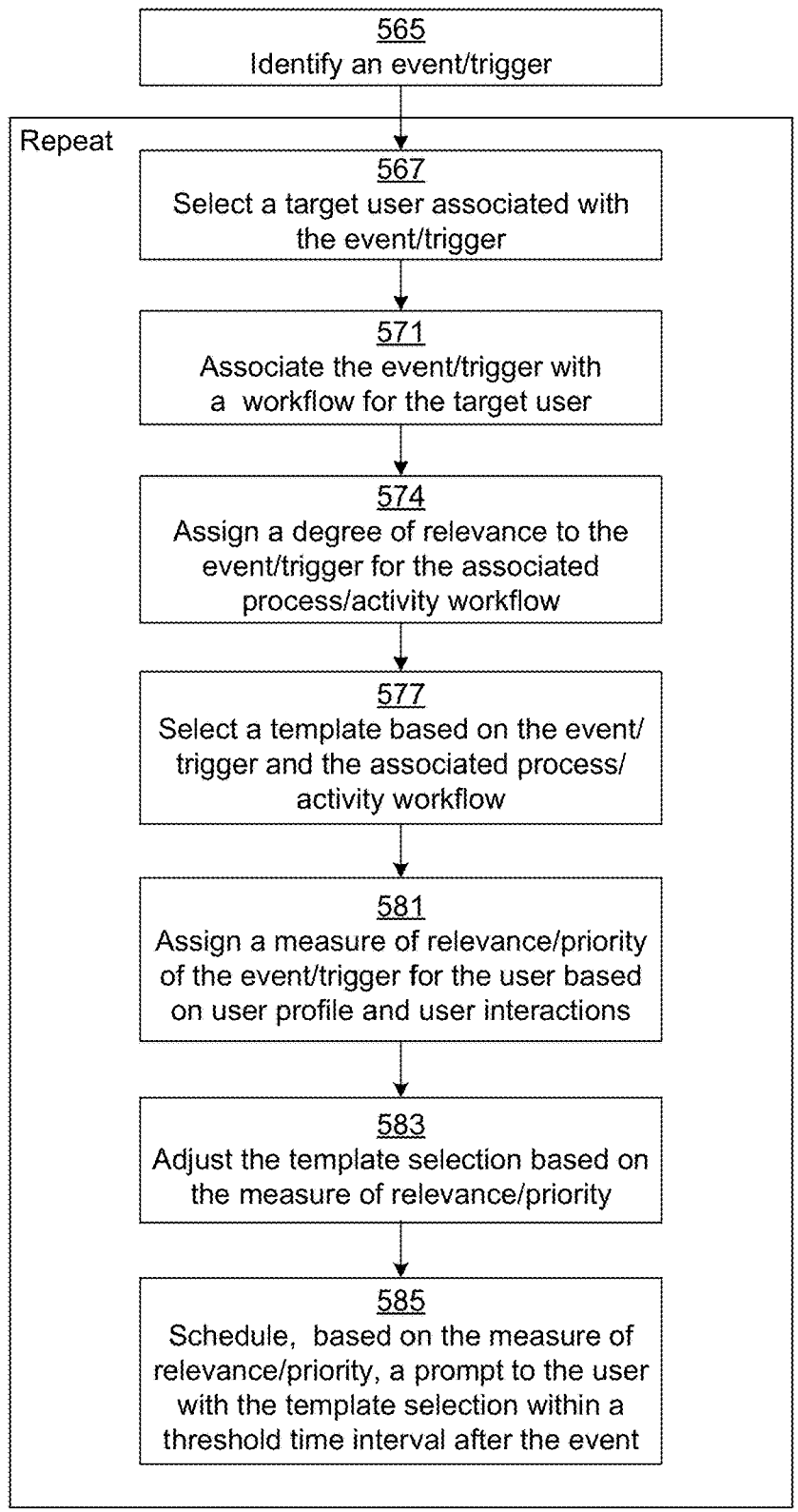
FIG. 5B is a flowchart illustrating a process for scheduling a prompt to the user for capturing an insight, in accordance with an embodiment of the invention.

FIG. 5B is a flowchart illustrating a process for scheduling a prompt to the user for capturing an insight, in accordance with an embodiment of the invention. The insight capture module 210 identifies 565 an event or trigger. The event or trigger may be based on an external system, for example, a CRM system or a calendar system. The insight capture module 210 repeats the following steps. The insight capture module 210 selects 567 a target user associated with the event/trigger. The insight capture module 210 associates the event/trigger with a workflow for the target user. The workflow could be a process workflow, an activity workflow, or an event workflow. The insight capture module 210 assigns 574 a degree of relevance to the event/trigger for the associated process/activity workflow.

Process workflows are defined and managed either by external systems (say a CRM recording an update in the status of an opportunity or an account) or by systems within an enterprise/organization associated with the insight management systems (such as calendar, action workflows, reminders etc.). In an embodiment, an event is triggered by a calendar entry. For example, on completion of a meeting, the user is prompted to capture based on the status of the account opportunity and its stage in the sales cycle. The insight management system can determine the status and stage from existing data in the insight management system and the integrated external systems (such as Enterprise CRM). If an existing opportunity is in early exploration stage with 30% probability, an appropriate template would guide the user to capture the information required to progress to the next stage of qualified opportunity with 50% probability.

Activity workflows are more dynamic and based on defining activity thresholds (say activity thresholds on a topic. For example when the system detects an increased activity (i.e., rate of user interactions) on a topic (that is identified as relevant for a user) then the user is prompted with a template to add/extend the conversation. Alternatively, if the system detects declining activity on a priority topic, it prompts the user with a template to rekindle the activity).

Action workflows are typically single action triggers such as receiving an email or a call from a designated contact or a reminder set for a scheduled timer etc. The insight management system maps these to process or activity workflows or sets them up as independent action workflows. In an embodiment, the insight management system triggers an event based on a communication received from a designated contact, i.e., an email or call received from designated contact triggers a capture request mapped to the contact lifecycle template.

The insight capture module 210 selects 577 a template based on the event/trigger and the associated process/activity workflow. The insight capture module 210 assigns 581 a measure of relevance/priority of the event/trigger for the user based on user profile and user interactions. The measure of relevance may be based on multiple attributes of users, e.g. role/function, expertise with respect to a topic associated with the template, priority assigned to the topic or category, and user's past activity and interactions (topic, category)

The insight capture module 210 adjusts 583 the template selection based on the measure of relevance/priority. For example if a user manages product X then templates associated with product X, competition for Product X etc. are selected for presenting to the target user.

The insight capture module 210 schedules 585, based on the measure of relevance/priority, a prompt to the user (a user interface presented to the user) based on the template selection within a threshold time interval after the event. In an embodiment, the insight capture module 210 receives the template selection from the user and starts capture of the insight using user interfaces based on the template.

Process of Assigning Scores to Insights and Users

Figure 6:
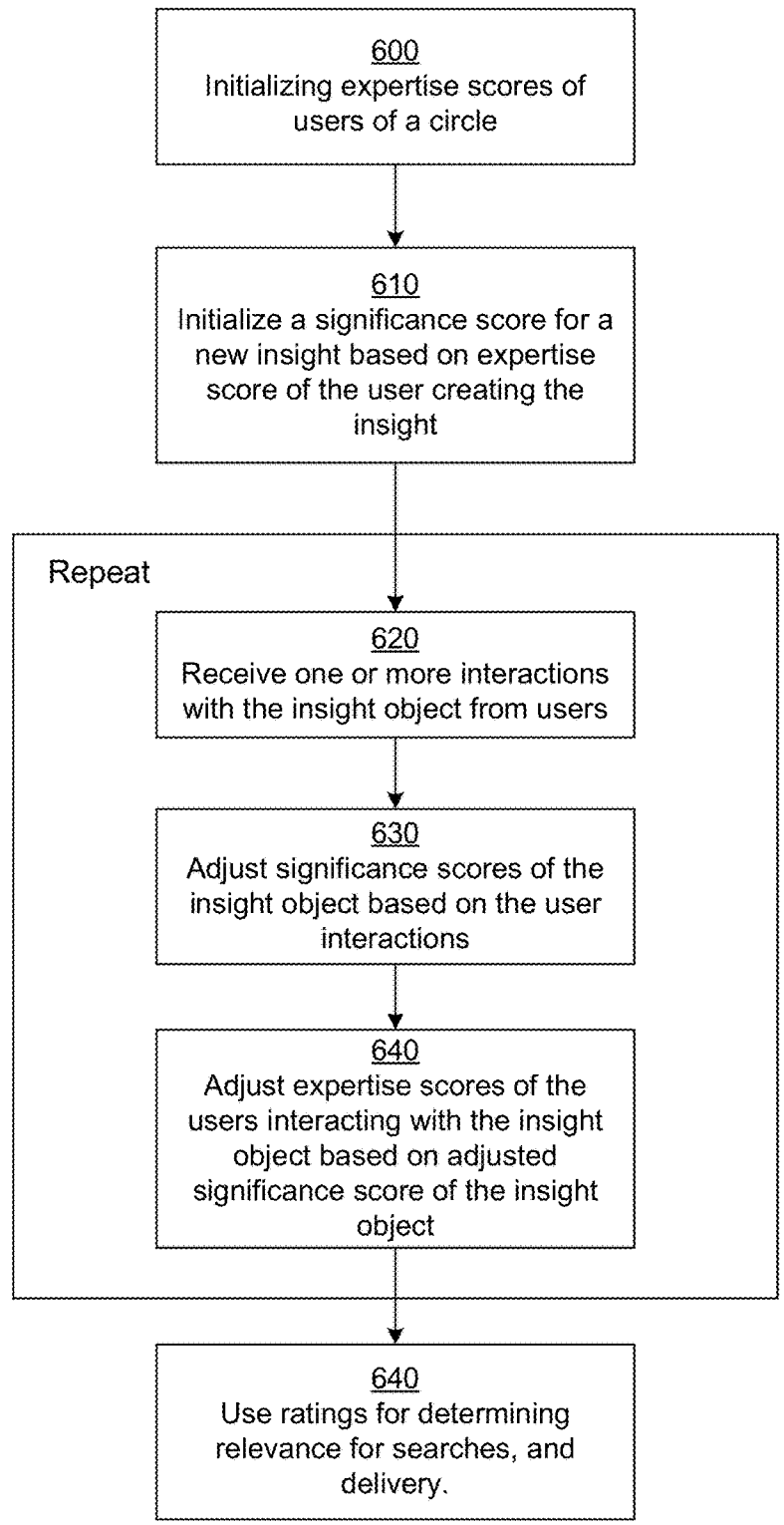
FIG. 6 is a flowchart illustrating a process for rating users and insights, in accordance with an embodiment of the invention.

FIG. 6 is a flowchart illustrating a process for rating users and insights, in accordance with an embodiment of the invention. The scoring engine 245 assigns scores to insight objects and users. The scoring engine 245 assigns expertise scores to users based on their expertise in a particular circle of users or based on their expertise in a particular topic. The scoring engine 245 assigns significance scores to insights based on various factors including rate of interaction of various users.

The scoring engine 245 initializes 600 expertise scores for a user when the user is added to the user account store 280. The scoring engine 245 initializes 600 the user based on information describing the user that may be obtained from various other systems of the organization, for example, an organization hierarchy describing the roles of the users within the hierarchy, the functions of the user, qualifications of the user in particular fields, and so on. In an embodiment the scoring engine 245 receives initial expertise score values from a system administrator. The scoring engine 245 maintains a set of topics, each topic characterized by a set of keywords that are mentioned in content associated with the topic. A topic is also referred to herein as a theme or a category. The insight management system 100 maintains associations between topics and functions of the organization. The scoring engine 245 assigns expertise scores for a user for a given topic. The scoring engine 245 may assign a high expertise score for a particular user for a topic T1 but a low expertise score for the user for another topic T2. The scoring engine 245 assigns a high expertise score to a user for a particular topic if the topic is related to the primary function of the user. For example, scoring engine 245 assigns higher expertise score for a user U1 for topic "strategy" if the primary function of the user is "business development." Similarly, the scoring engine 245 assigns lower expertise score for a user U1 for the topic strategy of the primary function of the user is "technology development." In an embodiment, the scoring engine 245 assigns an expertise score for a user for each circle that the user belongs to. The scoring engine 245 associates each circle with one or more topics. Accordingly, the expertise score of a user within a circle corresponds to the expertise score of the user for the topics of the circle. The scoring engine 245 adjusts the expertise score of a user for a topic of a circle on an ongoing basis depending on the types of interactions and rates of interactions of the user within the circle.

The scoring engine 245 receives a new insight and initializes 610 a significance score for the new insight based on the expertise score of the user creating the insight for the topics described in the insight. Accordingly, the scoring engine 245 initializes 610 a significance score of an insight to a higher value if the user creating the insight has higher expertise score for a topic described in the insight or if the user has a high expertise score within a circle of users.

The scoring engine 245 repeats the following steps to adjust scores of insights based on user interactions with insight objects as well as to adjust the expertise scores of users based on the user interactions with the insight objects. The insight management system 100 receives user interactions with insight objects. These interactions include users building on the insight object, rating the insight object, viewing the insight object, re-using the insight object, sharing the insight object with other users.

The scoring engine 245 adjusts the significance scores of an insight object based on the user interactions associated with the insight object. In an embodiment, the scoring engine 245 determines a weighted aggregate value based on user interactions performed within the last time interval. The scoring engine 245 determines whether to adjust the value of the significance score for the insight object (i.e., increment or decrement the significance score value) based on the weighted aggregate value. The scoring engine 245 weighs the user interactions by the expertise score of the user performing the interaction for a topic associated with the insight (or the expertise score within a circle associated with the insight). The scoring engine 245 assigns higher weights to interactions performed by users with higher expertise score in a topic associated with the insight. The scoring engine 245 also weighs the user interactions based on the types of interaction. For example, the scoring engine 245 assigns higher weight to an interaction representing a user building the insight by adding more information to the insight compared to an interaction representing a user viewing the insight.

In an embodiment, the scoring engine 245 determines a measure of strength of association between an insight and a topic. The strength of association between the insight and the topic indicates whether the insight is strongly associated with the topic or weakly associated with the topic. For example, a topic that is mentioned frequently in the insight is determined to be strongly associated with the insight and a topic that has few mentions in the insight is determined to be weakly associated with the insight. In these embodiments, scoring engine 245 weighs the user interactions based on the expertise of user in a topic as well as the strength of association of the topic with the insight. Accordingly, an interaction with the insight by a user that is an expert in a topic weakly associated with the insight is weighted less compared to a similar interaction by a user having the same level of expertise for a topic that is strongly associated with the insight.

The scoring engine 245 further adjusts 640 the expertise scores of the users based on the user interactions of the user with insights. The scoring engine 245 determines a weighted aggregate value based on user interactions performed by other users on information provided by the user including insights created by the user, information added by the user to insights (e.g., by building on the insights), interactions of other users with comments provided by the user to existing insights and so on. Accordingly, the scoring engine 245 determines a measure indicating how well other users have received information provided by the user. The scoring engine 245 determined whether to adjust the expertise score (i.e., increase or decrease the expertise score) based on the measure. The scoring engine 245 weighs the user interactions with information provided by the user based on the expertise score of the users performing the interaction. For example, if one or more users with high expertise score interact with an insight created by the user, the scoring engine 245 weighs these interactions higher than interactions by other users having low expertise scores. The scoring engine 245 also weighs the user interactions based on the type of interaction. For example, if the user created an insight in the past and other users build on the insight, the scoring engine 245 assigns high weight to the interactions compared to other users simply viewing the insight.

The scoring engine 245 further detects changes in significance scores of insights in the past time interval and adjusts expertise scores of users associated with the insight based on the changes in the significance scores of the insights. Accordingly, if the user created an insight or built upon an insight for which the significance score increased in the past time interval, the scoring engine 245 appropriately increases the expertise score of the user. Similarly, if the user created an insight or built upon an insight for which the significance score decreased in the past time interval, the scoring engine 245 appropriately decreases the expertise score of the user.

In an embodiment, scoring engine 245 repeats the steps 620, 630, and 640 described above periodically, for example, every T seconds, where T is a configurable parameter. In an embodiment, the scoring engine 245 adjusts the value of T based on a rate of interactions of users. Accordingly, the above steps are repeated at a rate that changes over time. At the end of each time interval, the scoring engine 245 first adjusts the significance scores of insights based on user interactions performed during the last time interval. Next, the scoring engine 245 adjusts the expertise scores of the users for various topics or circles based on the adjusted scores of the insights. The adjusted expertise scores of the users are used in the next time interval.

In an embodiment, the scoring engine 245 performs the adjustments of the significance scores of insights and expertise scores of users in a different order than that described above. Accordingly, the scoring engine 245 first adjusts the expertise scores of the users for various topics or circles based on the user interactions performed in the current time interval weighted by the significance scores determined in the previous time interval. The scoring engine 245 next adjusts the significance scores of insights based on the user interactions and the adjusted expertise scores of the users. The adjusted significance scores of the insights are used to adjust the expertise scores of the users in the next time interval.

In another embodiment, the scoring engine 245 iterates over the adjusted scores repeatedly at the end of each time interval. Accordingly, the scoring engine 245 adjusts the significance scores of the insights based on the user interactions and the current values of expertise scores. Since the significance scores of the insights have changed, the scoring engine 245 further adjusts the expertise scores of the users based on the changed values of the significance scores of insights. The scoring engine 245 repeats the two steps iteratively. The scoring engine 245 determines an aggregate measure of the changes in significance scores of the insights and expertise scores of the users. For each iteration, the scoring engine 245 measures a change in the aggregate measure of scores compared to the previous iteration. The scoring engine 245 stops iterating over the adjustment of scores for the interval if the value of the aggregate measure is below a threshold value. Accordingly, the scoring engine 245 waits for the scores of insights and users to reach a quiescence for each time interval.

In another embodiment, the scoring engine 245 detects events occurring in the insight management system and adjusts the scores of insights or users responsive to the events rather than performing the adjustments periodically. For example, if the scoring engine 245 receives a particular user interaction with an insight, the scoring engine 245 determines the changes in the significance score of the insight caused by the user interaction as well as changes in expertise scores of users associated with the interaction. For example, if the scoring engine 245 adjusts the score of an insight as a result of a particular interaction, the scoring engine 245 adjusts the expertise scores of the users associated with the insight, for example, expertise score of the user that created the insight or built upon the insight.

In an embodiment, the scoring engine 245 determines the amount by which a significance score of an insight or an expertise score of a user is adjusted based on the number of users associated with the insight. For example, if the insight is associated with a circle of users, the scoring engine 245 determines the amount by which a significance score of an insight or an expertise score of a user is adjusted based on the number of users in the circle. For example, if the insight is associated with a circle having a large number of users, the incremental impact of a user interaction on an insight is less compared to a similar interaction for an insight associated with a circle with few users.

The insight management system 100 uses the significance scores of the insights to determine relevance of the insight in searches, contextual feeds and delivery of insights. For example, insights with higher significance score for a topic are ranked higher for searches related to that topic. The insight management system 100 uses the significance scores of the insights to determine delivery or transmission of the insight to other users for engaging the users with the insights and prompting them for performing certain interactions with the insight. For example, the insight management system 100 uses the significance scores of the insights to determine a rate at which the insight is delivered or transmitted to a user. Accordingly, an insight having a high significance score is delivered repeatedly to the user at a higher rate compared to an insight having a low significance score. Similarly, an insight having a high significance score is delivered to more users compared to an insight having a low significance score. In contrast, if the significance score of the insight decreases, the data discovery module 240 ranks the insight lower in user searches and the data delivery module 290 decrease the rate of delivery or transmission of the insight to a user and decreases the number of users to whom the insight is transmitted. If the insight is determined to have a significance score below a threshold, the insight management system 100 either deletes the insight or marks the insight as inactive. Accordingly, the data discovery module 240 does not provide the insight in user searches and the data delivery module 290 stops delivering the insight to users. The insight management system 100 uses ratings to reward and recognize user contribution by assigning points, badges, levels to users and setting up progression and leaderboard dashboards.

Process of Tagging Insights

Figure 7:
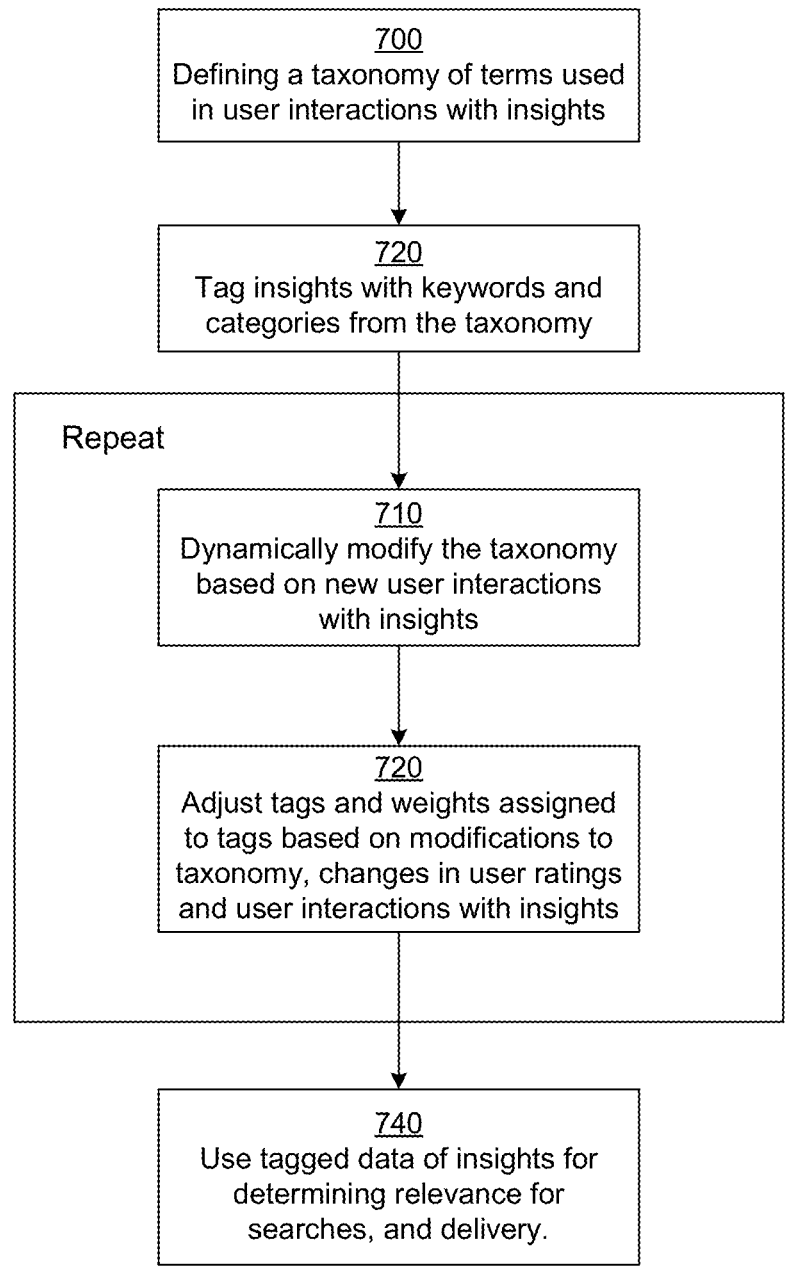
FIG. 7 is a flowchart illustrating a process for tagging insights with keywords and categories, in accordance with an embodiment of the invention.

FIG. 7 is a flowchart illustrating a process for tagging insights with keywords and categories, in accordance with an embodiment of the invention. The insight management system 100 defines a taxonomy based on terms used by users in various interactions recorded by the insight management system 100. In an embodiment, the insight management system 100 initializes a taxonomy based on input provided by experts and subsequently modifies the taxonomy based on user interactions. The taxonomy represents a set of keywords that are typically used within the community. The insight management system 100 extracts tags based on the taxonomy. Use of a common taxonomy brings consistency and relevance to the extracted tags. This avoids the discovery challenge where different users apply different tags and hence fail to discover.

In an embodiment, the insight management system 100, defines a taxonomy such that common functions are shared across different communities whereas provision is kept to define custom keywords for specific communities. A taxonomy may include multiple sections: keywords for functions common across communities, keywords common across vertical industries, keywords custom for a specific community, and keywords customized for a specific product line. The insight management system 100 sets up keywords are setup in a hierarchical structure to build in co-relations between different keywords. For example, a five level structure includes, function, tag, synonym, associated words, and attributes. The insight management system 100 associates each keyword with weight that is based on its level, for example, the tag has the highest weight, and the weight reduces for each lower level (synonym, associated words, attributes). In an embodiment, the insight management system 100 defines a taxonomy for each function associated with user since relevance of keywords can vary with each function.

The insight metadata module 295 identifies a function associated with an insight and retrieves the taxonomy for the function. The insight metadata module 295 tags each insight based on keywords and categories from the taxonomy. The insight metadata module 295 repeats the following steps (710 and 720). The insight metadata module 295 dynamically modifies 710 the taxonomy based on user interactions with insights. The insight metadata module 295 adjusts 720 tags and weights assigned to tags based on various factors including modifications to taxonomy, changes in user ratings, and user interactions with insights. The insight metadata module 295 uses 730 tagged data of insights for determining relevance of the insights for searches, and delivery of the insights.

In an embodiment, the insight management system 100 uses the author details to get the user's static profile data and uses the data to map insights to the appropriate taxonomy. This includes data describing primary function, secondary function, role, user type and privileges, location, set of circle memberships to get the circle profile data and its associations to the taxonomy.

The insight management system 100 assigns a weight to each keyword extracted (based on multiple degree-of-relevance) and uses it for contextualization during search. The insight management system 100 assigns degree-of-word relevance based on the level of the extracted keyword i.e. whether the keyword is a tag, synonym, associated word or an attribute. The insight management system 100 associates higher levels with higher degree-of-word relevance and hence higher weights. In an embodiment, the insight management system 100 assigns higher weight to longest match (for example, if there are keywords such as Strategic Partnership, Partnership and Strategic, then Strategic Partnership has the highest degree of word-relevance assigned.

In an embodiment, the insight management system 100 assigns degree-of-function relevance based on match of user's functions (primary and secondary) with the keywords functions, i.e. if the selected tag falls under the primary function taxonomy, it is considered a function match and the author is assumed to be more knowledgeable on the subject than a person from other function. This is used to determine a dimension of authority/no-authority.

In an embodiment, the insight management system 100 uses machine learning techniques to learn new keywords and tags used in the community and adds to the existing taxonomy to keep the taxonomy dynamic as well as adapts the weights assigned to existing keyword. Keywords are assigned appropriate weights and values based on the level of usage in the community.

Process of Delivering Insights to Users

Figure 8:
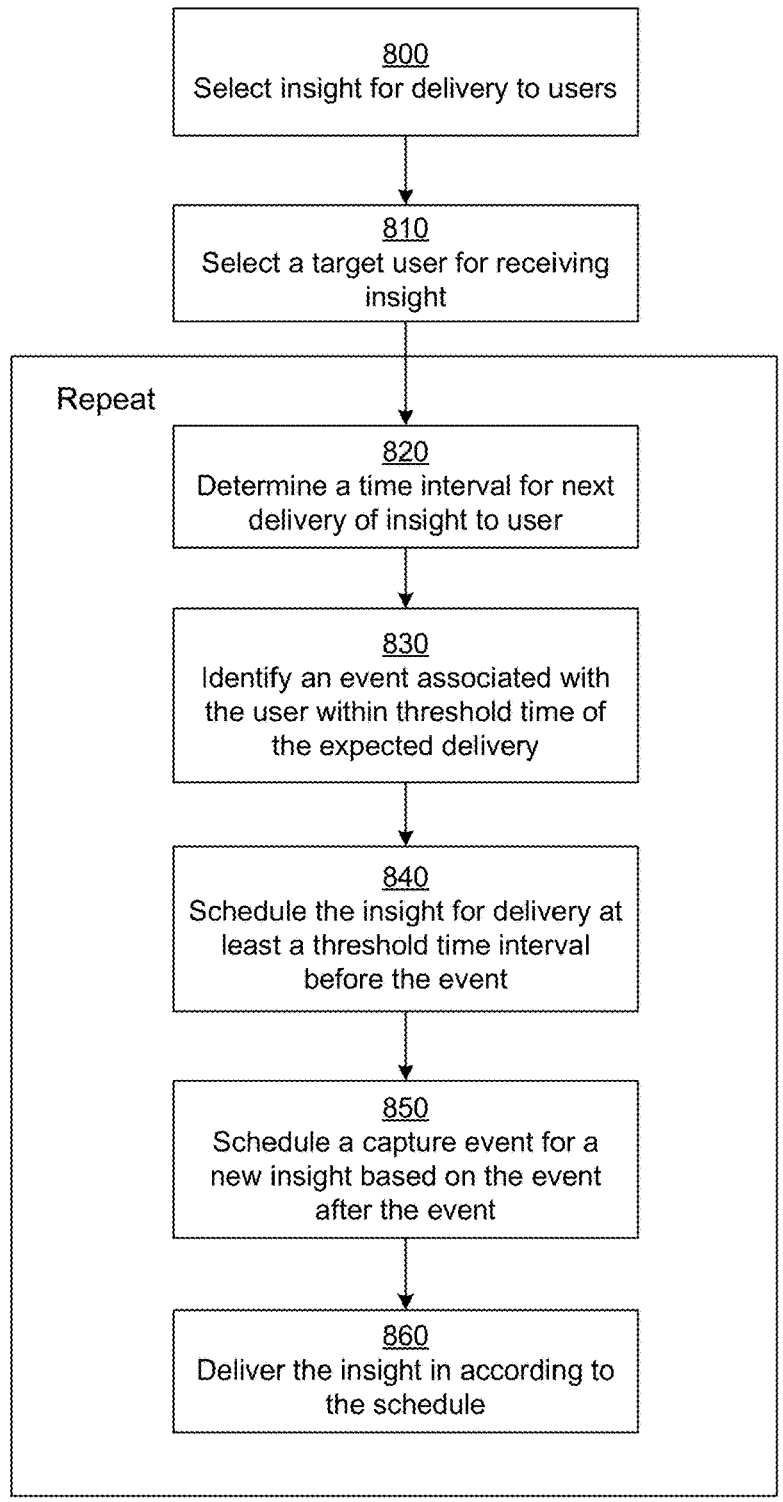
FIG. 8 is a flowchart illustrating a process for delivering insights to users, in accordance with an embodiment of the invention.

FIG. 8 is a flowchart illustrating a process for delivering insights to users, in accordance with an embodiment of the invention. The data delivery module 290 selects 800 an insight for delivery to users. The data delivery module 290 selects 810 a target user for delivery of the insight. The data delivery module 290 repeatedly delivers the insight to the same user a multiple times.

In an embodiment, the data delivery module 290 assigns relevance of insight for a user (e.g. based on multiple attributes e.g. function, topic/theme/category). The data delivery module 290 assigns a priority for user (e.g. based on degree of relevance and a determined measure of the value of insight to the user.) The data delivery module 290 determine co-relation with user's activity i.e., activity performed in the insight management system), user's last actions on the selected insight, user's last actions on the topic/theme/category of the insight. The data delivery module 290 determines co-relation with user's events (e.g., external events e.g. determined using calendar, actions assigned, reminders and so on.) The data delivery module 290 repeats this process of identifying matching users for an insight periodically since the activities of users change over time and different users may be determined to match an insight at different time intervals.

The data delivery module 290 delivers the insight multiple times even if the user views or otherwise interacts with the insight responsive to each delivery. In an embodiment, the data delivery module 290 determines the rate of delivery (or the time length of the time period after which the insight is delivered to the user) based on the degree-of-relevance of the insight for the user, priority of the insight for the user, measure of insight value for the user, and user actions on topics/categories/themes related to the insight. The data delivery module 290 also decreases the time interval for delivery of the insight based on an amount of activity repeated to the insight, for example, the amount of new information available for the insight. Each delivery of the insight may present new information available in the insight since the previous delivery as well as information that was previously delivered. An insight may describe a complex concept and repeated delivery of insight makes it more likely that the user gets familiar with the concept.

The data delivery module 290 determines 820 a time interval for next delivery of the insight to the user. The data delivery module 290 may deliver the insight periodically at a fixed time interval. In an embodiment, the data delivery module 290 increases the length of subsequent time intervals at which the insight is delivered. In an embodiment, data delivery module 290 increases the length of time interval exponentially, for example, by doubling the length of time interval after each delivery. In another embodiment, the data delivery module 290 increases the length of time interval linearly or as a polynomial function of the number of the iteration.

The data delivery module 290 identifies 830 an event associated with the user within a threshold of the next delivery of the insight. For example, the data delivery module 290 may interface with a calendar program that schedules meetings for the user to identify meetings within a threshold of the time of next delivery of the insight. The data delivery module 290 matches topics of the insight with the keywords within the meeting to identify a meeting that matches the topic. The data delivery module 290 selects the meeting that has the highest match with the topics of the insight. The data delivery module 290 schedules 840 the insight for delivery to the user a threshold time interval before the identified meeting. The data delivery module 290 delivers 860 the insight to the user in accordance with the schedule. If the data delivery module 290 does not identify any relevant event within a threshold time interval of the scheduled delivery, the data delivery module 290 delivers the insight according to the original schedule, without adjusting the schedule.

Figure 9F:
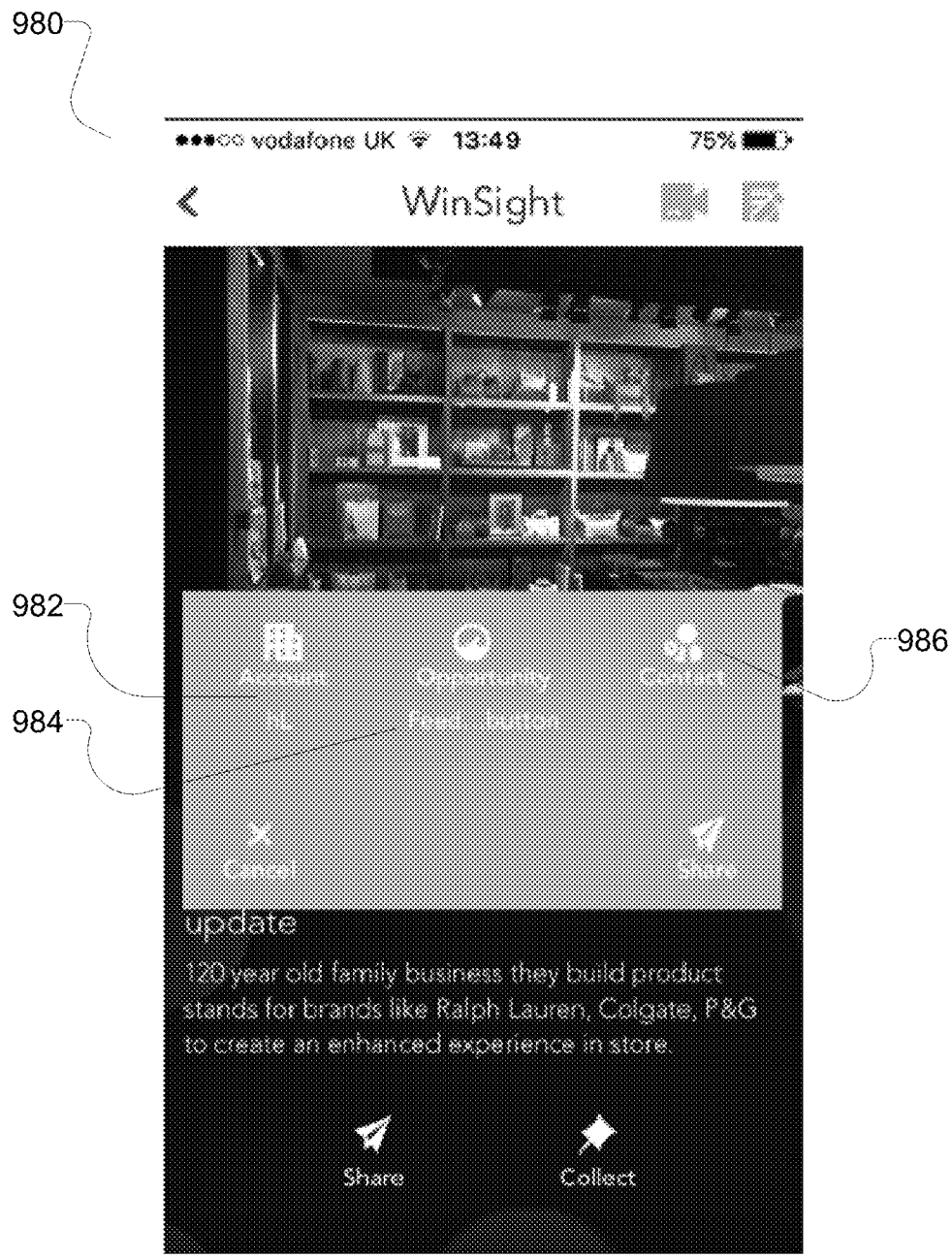
FIG. 9F shows a user interface illustrating an interface between the insight management system and an external system, for example, a CRM (customer relationship management) system, according to an embodiment.
Figure 9G:
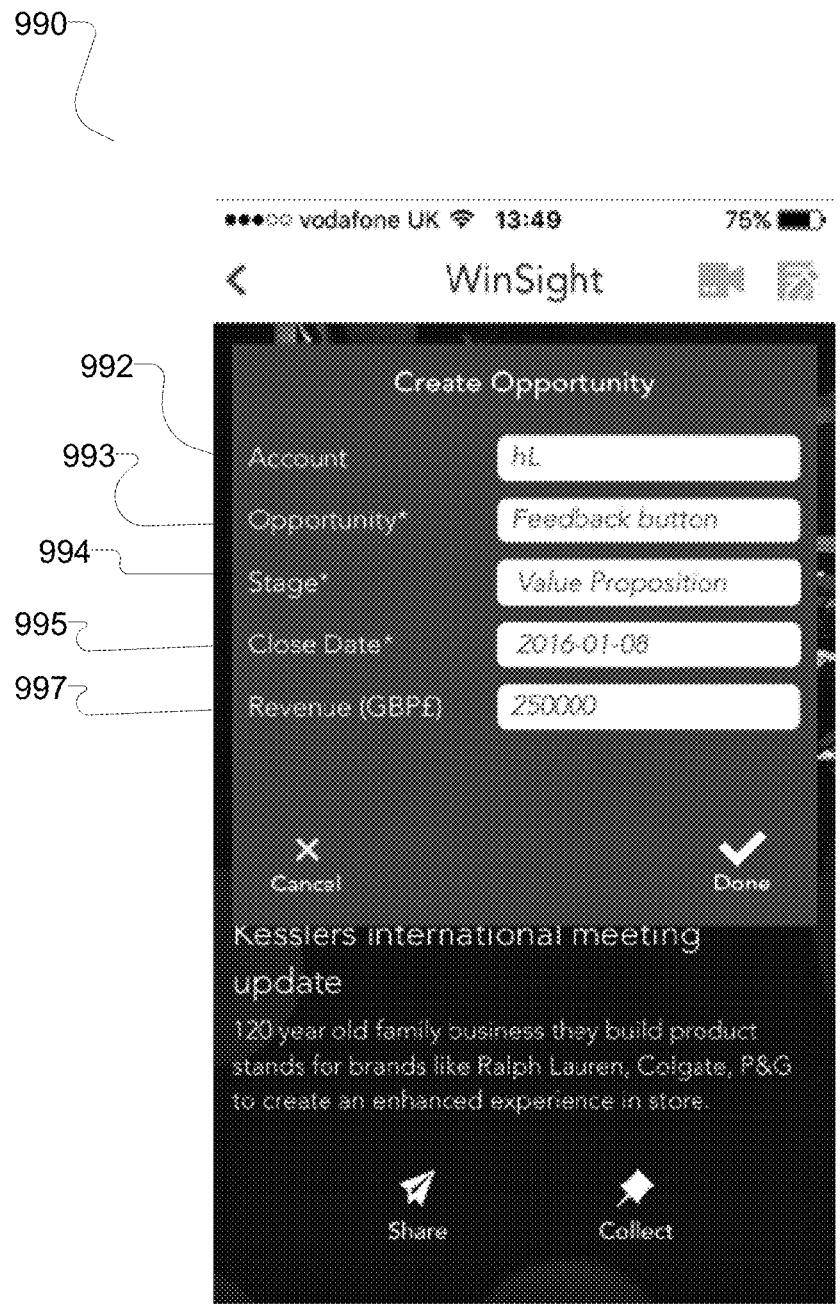
FIG. 9G shows a user interface for creating representations of entities in the insight management system based on an external system, according to an embodiment.

Although the examples described refer to a meeting, the embodiments apply to any event for which the data delivery module 290 can determine a specific time of occurrence. For example, the event may be a call scheduled by the user, a presentation scheduled by the user (for attending or presenting), a webinar, and so on. The data delivery module 290 may identify 830 events based on information received from external systems, for example, a CRM system. Examples of events associated with external systems used by data delivery module 290 for delivering insights to users are illustrated in FIGS. 9F and 9G and in the description of these figures.

In an embodiment, the insight capture module 210 schedules 850 a capture event for presenting the user with an interface for capturing a new insight based on the meeting. The insight capture module 210 schedules the capture event a threshold time interval after the identified meeting (or event). In an embodiment, the data delivery module 290 schedules an event for requesting the user for building on an insight a threshold time interval after the identified meeting (or event). For example, the data delivery module 290 identifies using a calendar program, a meeting (or any event) scheduled in future by the user such that the meeting is associated with a topic. The data delivery module 290 identifies a matching insight that matches the topic or topics of the scheduled event. The data delivery module 290 presents the user with a user interface to build on the matching insight after a threshold time interval after the meeting. The data delivery module 290 may repeat this process and present the same insight to the user repeatedly after matching events. This allows the user to build on the insight when information on the topics of the insight are fresh in the users mind shortly after the meeting.

In an embodiment, the data delivery module 290 adjusts a scheduled time of delivery of an insight based on a user activity. For example, the data delivery module 290 determines a user activity that occurs within a threshold time interval of the scheduled insight such that the activity is relevant to the insight or to the topic of insight. The data delivery module 290 adjusts the time of delivery of the insight based on the user activity such that the insight is delivered right after or before the activity. For example, if the user activity comprises viewing content related to a topic, the data delivery module 290 adjusts delivery of an insight related to the topic based on the user activity.

User Interfaces for Interacting with Insight Management System

FIG. 9A is a screenshot of a user interface illustrating capture of an insight, in accordance with an embodiment of the invention. The user interface may be executed by an application executing on a mobile device equipped with a camera. The screen shot shows a user interface 900 comprising a widget 940 displaying a video being recorded. The user interface includes one or more widgets 920 that allow the user to preview previously recorded segments of the video and recapture the segments. A user can record or recapture a segment. When a user clicks on a button 920 to record a segment, the presentation of button 920 changes to that shown for button 930. After the recording of the segment is complete, the presentation of the button 930 reverts to that shown for button 920. For recording each segment, the user interface 900 shows an indication of time remaining and the time for which the segment has been recorded so far. For example, the user interface 900 may include a moving progress indicator 910. The user interface 900 also displays a cue 950 describing the segment being recorded.

FIG. 9B is a screenshot of a user interface showing a selected template, in accordance with an embodiment of the invention. The screenshot shown in FIG. 9B shows the user interface responsive to selecting a particular template. Each template is presented to the user as a series of segments, where details such as title or the cue of the segment, the duration of the segment etc. is displayed to guide the user.

FIG. 9C is a screenshot of a user interface illustrating selection of a particular template, in accordance with an embodiment of the invention. The user interface shows a list of templates 945 available to the user. This list includes templates that have been created by the user or templates shared by other users in the circle or community. The user is also given an option to create/edit (as per FIG. 9D interface) a custom template if the existing set of templates do not meet the user requirement. The user interface receives a selection of a particular template and displays the user interface for capturing insights for that particular template. For example, if a template has 3 segments, 3 sets of buttons 921 are shown to the user for recording/previewing/recapturing the segments. However, if the template has N segments, N sets of buttons are shown for recording/previewing/recapturing the segments. In an embodiment, each set of buttons displays information describing the segment, for example, the button 921a shows that the segment is "Buying Cycle", button 921b shows that the segment is "Needs and Issues", and button 921c shows that the segment is "Expected Outcome".

FIG. 9D is a screenshot of a user interface allowing users to edit a template, in accordance with an embodiment of the invention. The user interface shows widgets 953 for selecting the duration of the entire template. The user interface shows widgets allowing users to define transitions between segments. The user interface shows widgets allowing user to select time for individual segments using a slider 957. A user can create/edit a template and publish as a Personal Template or share it with other circles or the community.

FIG. 9E is a screenshot of a user interface illustrating adding metadata to an insight, in accordance with an embodiment of the invention. The user interface allows a user to select a particular metadata attribute of the insight and specify text or media describing that attribute. For example, user interface 963 shows a widget 971 for receiving a selection of attribute "key points" and associated information via text box 973. The user interface 966 shows widget 975 for receiving a selection of another attribute and text information describing that attribute. The user interface 968 shows widgets 977 for receiving metadata attributes such as title, widget 978 for receiving a media file associated with the insight, widget 979 for receiving tags describing the insight, and so on. The user interface 968 shows a widget 974 for publishing the insight to one or more circles, as specified using widget 982.

FIG. 9F shows a user interface illustrating an interface between the insight management system and an external system, for example, a CRM (customer relationship management) system, according to an embodiment. The user interface 980 allows any user, to associate or publish insights and review and receive information from the external system to the insight management system 100. The insight management system 100 receives information describing accounts 982 stored in the external system. For example, an external system may store client accounts or customer accounts for an organization. The client account identifies users, organizations, groups, enterprises, vendors, or other entities represented in the external system. The insight management system 100 further determines and associates information describing each account, for example, topics associated with the account, an address associated with the account, a location of the account, products or services associated with the account, and so on.

The insight management system 100 receives information describing potential engagements or interactions with the accounts of the external system identified as opportunities 984. For example, an opportunity may identify a potential client of the organization associated with the insight management system 100 and include information describing the products of interest to the client, needs of the client, a history of interactions with the client in connection with the opportunity, and so on.

The insight management system 100 receives and associates information describing a contact 986 associated with the account. In an embodiment, the contact corresponds to a user profile stored in the insight management system 100. The contact associated with the account may perform interactions with the client associated with the account, and interactions with other users of the insight management system 100 that are associated with the account. For example, the contact 986 may provide feature suggestions for products based on interactions with the account, schedule and participate in events or meetings associated with the account, collect feedback for the account or opportunities associated with the account from other users of the insight management system 100. Accordingly, the insight management system 100 associates topics and one or more circles of users associated the contact 986 with the account 982.

In some embodiments, the insight management system 100 receives the information from the external system using an application programming interface (API) of the external system. The insight management system 100 may automatically import the information without requiring any user input. Alternatively, the insight management system 100 presents the information to a user, thereby receiving an approval from the user and possible modifications to the information or further metadata describing the information.

FIG. 9G shows a user interface for creating representations of entities in the insight management system based on an external system, according to an embodiment. The insight management system 100 may automatically retrieve data from an external system (e.g., a CRM system) and create representations of entities based on the external system, for example, accounts, opportunities, events, and so on.

The insight management system 100 may present a user interface to a user to validate the data retrieved from the external system and annotate it with additional metadata if applicable. The user interface 990 shows widgets for receiving various attributes of an entity based on an external CRM system. The user interface 990 presents the imported values of the attributes to the user and allows the user to edit the values. The user interface 990 presents and receives modifications/values of attributes including, an account name 992, a name of the opportunity 993, a stage 994 associated with the opportunity (for example, a stage of a project associated with the opportunity), a close date 995 for the opportunity, and other attributes, for example, a revenue 997.

Figure 10A:
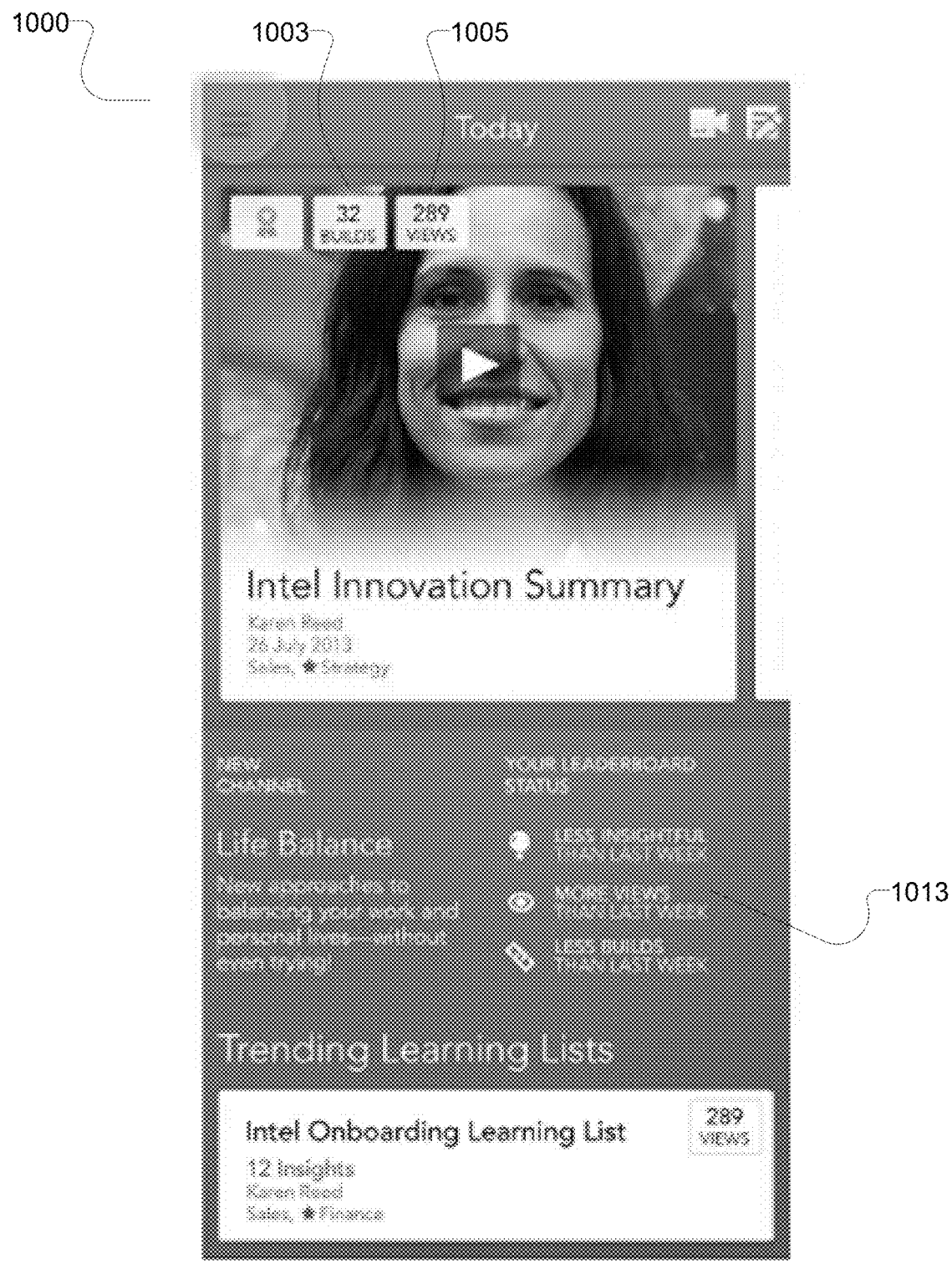
FIG. 10A is a screenshot of a user interface illustrating a dashboard presenting information describing various insights in the system, in accordance with an embodiment of the invention.

FIG. 10A is a screenshot of a user interface for allowing users to view selected insights, in accordance with an embodiment of the invention. The user interface 1000 presents information describing various actions that were performed in the insight management system 100. These actions may be represent actions performed in a particular circle or a selected of circles as specified by the user. Alternatively, these actions may represent all actions performed across all insights of a collection or a set of collections within a time interval (for example, today, or this week, or this month.) The user interface 1000 shows the number of build actions 1003 performed by users on insights of the selected circle or circles. The user interface 1000 shows the number of views 1005 performed by users on insights of the selected circle or circles. The user interface 1000 shows information 1013 comparing actions of a particular time period with another time period, for example, the number of views this week compared to last week, number of builds this week compared to last week, and so on.

Figure 10B:
FIG. 10B is a screenshot of a user interface illustrating a dashboard presenting information describing various insights in the system, in accordance with an embodiment of the invention.

FIG. 10B is a screenshot of a user interface illustrating a dashboard presenting information describing various insights in the system, in accordance with an embodiment of the invention. A user interacting with the insight management system 100 may request information describing the various insights of the system. The user interface 1001 presents various insights ranked based on different criteria. For example, the user interface 1001 shows the most valuable insights 1010 identifying the insights with the highest significance scores. The user interface 1000 shows the insights with highest builds 1020 identifying the insights with which the users have interacted to provide the highest number of builds, thereby providing a measure of the most active insights based on this particular criteria. The user interface 1001 also shows the most popular insights 1030 and the most viewed insights 1040.

Figure 10C:
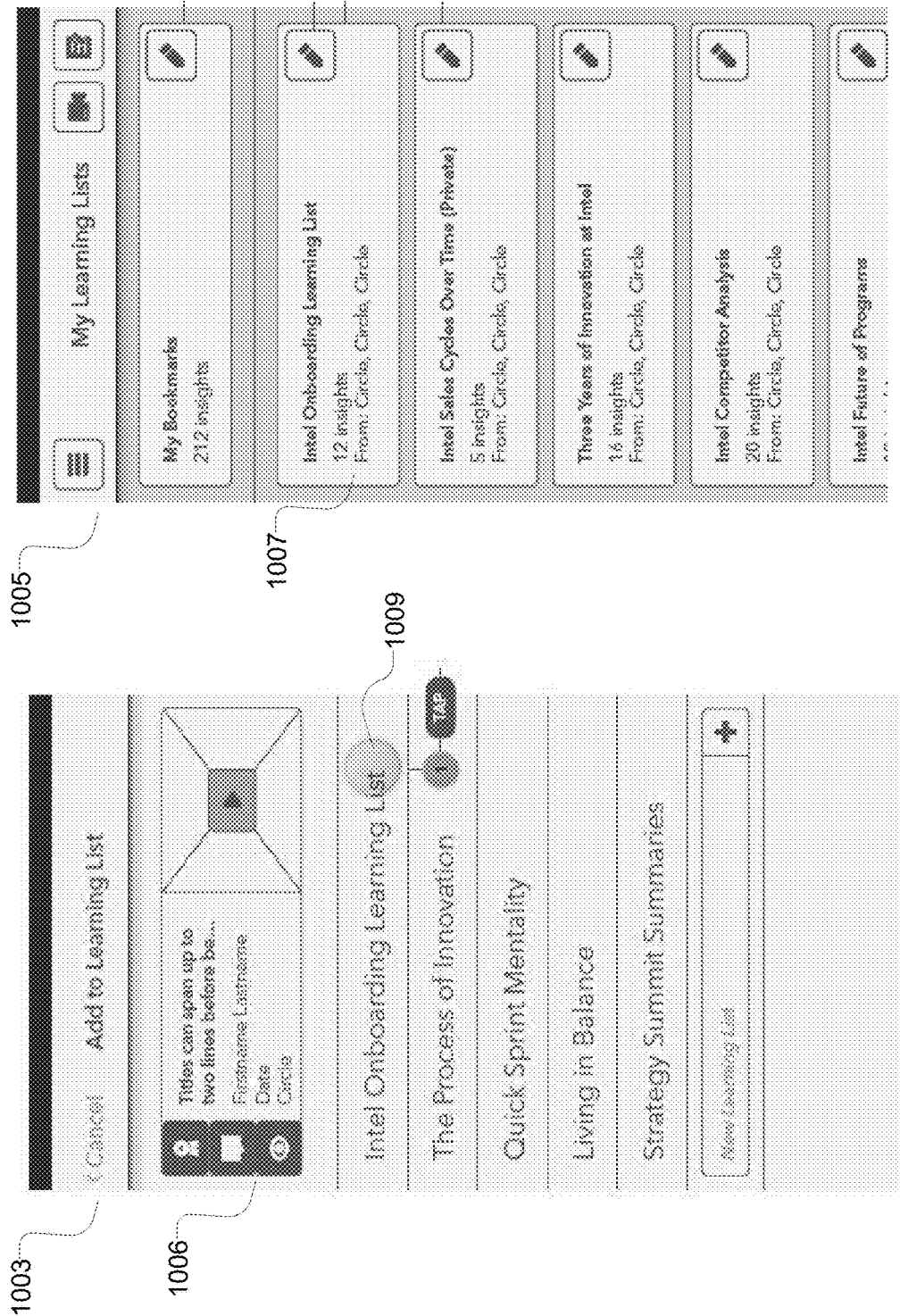
FIG. 10C is a screenshot of a user interface for defining collections of insights, in accordance with an embodiment of the invention

FIG. 10C is a screenshot of a user interface for defining collections of insights, in accordance with an embodiment of the invention. The user interface 1003 allows users to add to a collection, referred to as a learning list. The user interface 1003 includes a widget 1009 that allows user to select a collection. The user interface 1003 includes a widget 1006 that allows the user to add an insight to the selected collection.

The user interface 1005 presents various collections associated with a user. These collections may be collections that were created by the user or selected by the user, for example, for following. The user interface 1005 includes a widget 1007 for allowing a user to select a particular collection so as to view statistics describing the collection, insights from the collection, and so on.

Computing Machine Architecture

Figure 11:
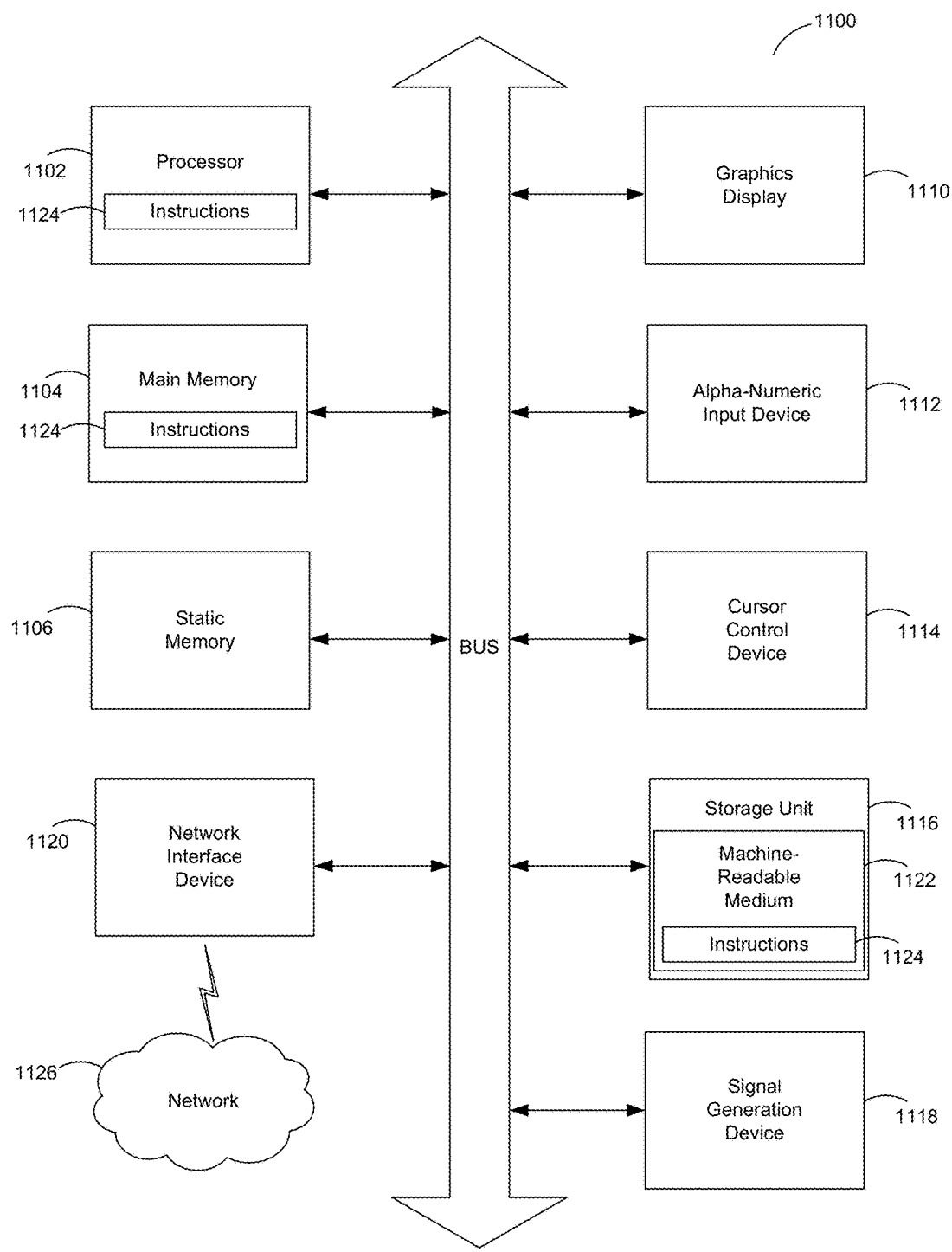
FIG. 11 is a block diagram illustrating components of an example machine able to read instructions from a machine-readable medium and execute them in a processor.

FIG. 11 is a block diagram illustrating components of an example machine able to read instructions from a machine-readable medium and execute them in a processor (or controller). The example machine may be used for executing the instructions of a system 100. Specifically, FIG. 11 shows a diagrammatic representation of a machine in the example form of a computer system 1100 within which instructions 1124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include graphics display unit 1110 (e.g., a plasma display panel (PDP), a liquid crystal display (LCD), a projector, or a cathode ray tube (CRT)). The computer system 1100 may also include alphanumeric input device 1112 (e.g., a keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for maintaining data objects representing insights, the method comprising:
   maintaining, by a processor, a circle of users comprising a plurality of users associated with a topic;
   storing, by the processor, a plurality of data objects, each data object representing an insight associated with the topic;
   determining an expertise score for each user of the circle of users, the expertise score for each user based on interactions of the user with data objects from the plurality of data objects;
   receiving from a client device of a user from the circle of users, information describing a new content item, the new content item associated with the topic;
   storing a data object representing the new content item;
   receiving interactions associated with stored data object from a plurality of others users belonging to the circle of users;
   determining a significance score for the data object, the significance score indicative of a significance of the content item within the circle of the user, the significance score determined as a weighted average of one or more of: an expertise score of the user providing the content item and interactions of the users with the new data object, each interaction weighted by expertise score of a user interacting with the new data object, the expertise score associated with the topic;
   determining a rate of delivery of the data object to users of the circle based on the significance score of the new data object; and
   transmitting the new data object to users of the circle in accordance with the determined rate of delivery.

2. The computer implemented method of claim 1, wherein determining the significance score for the data object comprises:
   initializing the significance score of the data object based on an expertise score of the user providing the insight.

3. The computer implemented method of claim 2, wherein the user is a first user, the method further comprising:
   receiving an interaction from a second user from the circle of users; and
   adjusting the significance score of the data object based on a type of interaction and the expertise score of the second user.

4. The computer implemented method of claim 3, further comprising, repeating the steps of:
   adjusting expertise scores of one or more users interacting with the data object responsive to a change in value of the significance score of the data object; and
   adjusting the significance score of the data object responsive to a change in the expertise score of a user that interacted with the data object.

5. The computer implemented method of claim 1, wherein receiving information describing the new data object comprises:
   storing a plurality of templates, each template identifying a sequence of segment, each segment associated with a cue; and
   receiving a selection of a template and configuring for presentation a user interface for interacting with the user to receive the information describing the new data object, the user interface configured to present cues associated with the segments.

6. The computer implemented method of claim 5, further comprising:
   adjusting expertise scores of one or more users interacting with the data object based on the selected template used for creating the data object; and
   adjusting the significance score of the data object responsive to a change in the expertise score of a user that interacted with the data object.

7. The computer implemented method of claim 5, further comprising:
   annotating the data object with metadata determined based on selected template used for capturing the data object.

8. The computer implemented method of claim 1, further comprising:
   annotating the data object with metadata determined based on user profile data of the user providing the data, the user profile data comprising a function of the user within the circle of users and one or more topics describing expertise of the user.

9. The computer implemented method of claim 1, further comprising:
   adjusting one or more tags associated with the data object representing the insight, the adjusting based on a taxonomy, wherein the taxonomy is dynamically modified based on keyword used by users of the circle of users.

10. The computer implemented method of claim 1, wherein receiving information describing the new data object comprises:
    identifying an event associated with the user from the circle of users;
    selecting, by the processor, a template from a plurality of templates, each template comprising a sequence of segments, wherein the selection of template is based on the event associated with the user; and
    configuring for presentation, a user interface based on the selected template, the user interface comprising a plurality of widgets, each widget for performing interactions associated with a segment from the sequence, wherein the user interface is sent for presentation to a client device associated with the user within a threshold time interval of the event.

11. The computer implemented method of claim 1, wherein receiving information describing the new data object comprises:
    configuring for presentation, a first user interface identifying a plurality of templates, each template comprising a sequence of segments receiving, via the first user interface, a selection of a particular template from the plurality of templates presented via the user interface, the particular template associated with a particular sequence of segments; and configuring for presentation, a second user interface comprising a plurality of widgets, each widget for performing interactions associated with a segment from the particular sequence.

12. The computer implemented method of claim 10, wherein each segment of the selected template is associated with a cue describing expected content for the segment, further comprising, for each segment:

presenting a cue associated with the segment;

responsive to presenting the cue, receiving media from the user, the media comprising one or more of video, audio, or text content; and associating the receiving media from the user with the data object representing the insight.

13. The computer implemented method of claim 1, wherein receiving information describing the new data object comprises configuring for presentation a user interface comprising:

a plurality of widgets, each widget corresponding to a segment, each widget configured to receive a request for one of: recording of the segment, recapture of a previously recorded segment, or preview of a previously recorded segment; and a widget for displaying video corresponding to a selected segment.

14. The computer implemented method of claim 13, wherein the user interface is configured to:

responsive a user selecting a widget for recording a segment associated with an allocated time for the segment, and displaying a widget while recording the segment, the widget indicating a difference between the allocated time and an amount of time spent recording the segment.

15. The computer implemented method of claim 13, wherein the user interface is configured to:

responsive a user selecting a widget for recording a segment associated with an allocated time for the segment, displaying a cue associated with the segment.

16. The computer implemented method of claim 1, further comprising:

scheduling a particular delivery of the new data object based on the determined rate of delivery;

identifying an event associated with the user within a threshold of the particular delivery of the insight; and adjusting a time of the particular delivery of the new data object based on the identified event.

17. The computer implemented method of claim 15, wherein adjusting a time of the particular delivery of the new data object based on the identified event comprises changing the time of delivery of the data object to a time occurring a predetermined time interval before the identified event.

18. A non-transitory computer readable storage medium storing instructions for:

maintaining, by a processor, a circle of users comprising a plurality of users associated with a topic;

storing, by the processor, a plurality of data objects, each data object representing an insight associated with the topic;

determining an expertise score for each user of the circle of users, the expertise score for each user based on interactions of the user with data objects from the plurality of data objects;

receiving from a client device of a user of the circle of users, information describing a new content item, the new content item associated with the topic;

storing a data object representing the new content item;

receiving interactions associated with stored data object from a plurality of others users belonging to the circle of users;

determining a significance score for the data object, the significance score indicative of a significance of the content item within the circle of the user, the significance score determined as a weighted average of one or more of: an expertise score of the user providing the content item and interactions of the users with the new data object, each interaction weighted by expertise score of a user interacting with the new data object, the expertise score associated with the topic;

determining a rate of delivery of the data object to users of the circle based on the significance score of the new data object; and transmitting the new data object to users of the circle in accordance with the determined rate of delivery.

19. The non-transitory computer readable storage medium of claim 18, wherein the user is a first user, the method further comprising:

receiving an interaction from a second user from the circle of users; and adjusting the significance score of the data object based on a type of interaction and the expertise score of the second user.

20. A computer system, comprising:

one or more electronic processors; and a non-transitory computer readable storage medium storing instructions for:

maintaining, by a processor, a circle of users comprising a plurality of users associated with a topic;

storing, by the processor, a plurality of data objects, each data object representing an insight associated with the topic;

determining an expertise score for each user of the circle of users, the expertise score for each user based on interactions of the user with data objects from the plurality of data objects;

receiving from a client device of a user of the circle of users, information describing a new content item, the new content item associated with the topic;

storing a data object representing the new content item;

receiving interactions associated with stored data object from a plurality of others users belonging to the circle of users;

determining a significance score for the data object, the significance score indicative of a significance of the content item within the circle of the user, the significance score determined as a weighted average of one or more of: an expertise score of the user providing the content item and interactions of the users with the new data object, each interaction weighted by expertise score of a user interacting with the new data object, the expertise score associated with the topic;

determining a rate of delivery of the data object to users of the circle based on the significance score of the new data object; and transmitting the new data object to users of the circle in accordance with the determined rate of delivery.

* * * * *